(12) United States Patent
Perez Muñoz et al.

(10) Patent No.: US 11,384,228 B2
(45) Date of Patent: *Jul. 12, 2022

(54) THERMOFORMED FILM COMPOSITIONS WITH ENHANCED TOUGHNESS AFTER THERMOFORMING PROCESSES

(71) Applicants: Dow Global Technologies LLC, Midland, MI (US); PBBPolisur S.R.L., Buenos Aires (AR)

(72) Inventors: Maria Laura Perez Muñoz, Bueonos Aires (AR); João Gargalaka, Jr., Jundiai-São Paulo (BR); Nicolas Cardoso Mazzola, Jundiai-São Paulo (BR); Gianna Buaszczyk, São Paulo (BR); Carmelo Declet Perez, Freeport, TX (US); Sydney E. Hansen, Houston, TX (US)

(73) Assignees: Dow Global Technologies LLC, Midland, MI (US); PBBPolisur S.R.L., Buenos Aires (AR)

( * ) Notice: Subject to any disclaimer, the term of this patent is extended or adjusted under 35 U.S.C. 154(b) by 204 days.

This patent is subject to a terminal disclaimer.

(21) Appl. No.: 16/647,238

(22) PCT Filed: Sep. 19, 2018

(86) PCT No.: PCT/US2018/051704
§ 371 (c)(1),
(2) Date: Mar. 13, 2020

(87) PCT Pub. No.: WO2019/060387
PCT Pub. Date: Mar. 28, 2019

(65) Prior Publication Data
US 2020/0270433 A1    Aug. 27, 2020

Related U.S. Application Data

(60) Provisional application No. 62/561,833, filed on Sep. 22, 2017.

(51) Int. Cl.
*B32B 27/32* (2006.01)
*C08L 23/08* (2006.01)
(Continued)

(52) U.S. Cl.
CPC .......... *C08L 23/0815* (2013.01); *B32B 27/08* (2013.01); *B32B 27/32* (2013.01);
(Continued)

(58) Field of Classification Search
CPC ............................ B32B 27/32; C08L 23/0815
See application file for complete search history.

(56) References Cited

U.S. PATENT DOCUMENTS 3,645,992 A    2/1972  Clayton
3,914,342 A   10/1975  Mitchell
(Continued)

FOREIGN PATENT DOCUMENTS

EP    613774 B1    5/1997
WO    2007095667 A1    8/2007
(Continued)

OTHER PUBLICATIONS

Randall, J.C., "Polymer Sequence Determination: Carbon-13 NMR Method", Academic Press, New York (1977).
(Continued)

*Primary Examiner* — Zachary M Davis
(74) *Attorney, Agent, or Firm* — Dinsmore & Shohl LLP

(57) ABSTRACT

Embodiments of thermoformed monolayer or multilayer films are provided, wherein the thermoformed monolayer multilayer films comprise a first composition comprising at least one ethylene-based polymer, wherein the first composition comprises a Molecular Weighted Comonomer Distri-
(Continued)

bution Index (MWCDI) value greater than 0.9, and a melt index ratio ($I_{10}/I_2$) that meets the following equation: $I_{10}/I_2 \geq 7.0 - 1.2 \times \log(I_2)$.

20 Claims, 7 Drawing Sheets

(51) Int. Cl.
  *B32B 27/08* (2006.01)
  *B65D 65/40* (2006.01)
  *C08F 210/16* (2006.01)
  *C08J 5/18* (2006.01)

(52) U.S. Cl.
  CPC ............ *B65D 65/40* (2013.01); *C08F 210/16* (2013.01); *C08J 5/18* (2013.01); *B32B 2250/05* (2013.01); *B32B 2250/246* (2013.01); *B32B 2250/40* (2013.01); *B32B 2553/00* (2013.01); *C08F 2410/04* (2013.01); *C08J 2323/06* (2013.01); *C08J 2323/08* (2013.01); *C08J 2423/06* (2013.01); *C08J 2423/16* (2013.01)

(56) References Cited

U.S. PATENT DOCUMENTS

| | | |
|---|---|---|
| 4,076,698 A | 2/1978 | Anderson et al. |
| 4,314,912 A | 2/1982 | Lowery et al. |
| 4,547,475 A | 10/1985 | Glass et al. |
| 4,612,300 A | 9/1986 | Coleman |
| 5,064,802 A | 11/1991 | Stevens et al. |
| 5,153,157 A | 10/1992 | Hlatky et al. |
| 5,272,236 A | 12/1993 | Lai et al. |
| 5,278,272 A | 1/1994 | Lai et al. |
| 5,296,433 A | 3/1994 | Siedle et al. |
| 5,321,106 A | 6/1994 | Lapointe |
| 5,350,723 A | 9/1994 | Neithamer et al. |
| 5,425,872 A | 6/1995 | Devore et al. |
| 5,582,923 A | 12/1996 | Kale et al. |
| 5,625,087 A | 4/1997 | Neithamer et al. |
| 5,721,185 A | 2/1998 | Lapointe et al. |
| 5,733,155 A | 3/1998 | Sagawa |
| 5,783,512 A | 7/1998 | Jacobsen et al. |
| 5,854,045 A | 12/1998 | Fang et al. |
| 5,883,204 A | 3/1999 | Spencer et al. |
| 5,919,983 A | 7/1999 | Rosen et al. |
| 5,928,740 A | 7/1999 | Wilhoit et al. |
| 5,977,251 A | 11/1999 | Kao et al. |
| 6,103,657 A | 8/2000 | Murray |
| 6,515,155 B1 | 2/2003 | Klosin et al. |
| 6,569,538 B1 | 5/2003 | Kaschel |
| 6,582,828 B1 | 6/2003 | Kaschel |
| 6,696,379 B1 | 2/2004 | Carnahan et al. |
| 7,163,907 B1 | 1/2007 | Canich et al. |
| 9,242,431 B2 | 1/2016 | Cruz et al. |
| 9,505,508 B2 | 11/2016 | Berbert |
| 2009/0018299 A1* | 1/2009 | Tasaki ............... B32B 27/32 526/348 |
| 2013/0046061 A1 | 2/2013 | Hermel-Davidock et al. |
| 2014/0072787 A1 | 3/2014 | Gargalaka, Jr. et al. |
| 2014/0134302 A1 | 5/2014 | Hodge |
| 2017/0080692 A1 | 3/2017 | Gargalaka, Jr. et al. |
| 2017/0129229 A1 | 5/2017 | Wang et al. |
| 2017/0129230 A1 | 5/2017 | Wang et al. |
| 2017/0226244 A1 | 8/2017 | Goyal et al. |

FOREIGN PATENT DOCUMENTS

| | | | |
|---|---|---|---|
| WO | WO-2015200743 A1 * | 12/2015 | ............ C08J 5/18 |
| WO | 2017106120 A2 | 6/2017 | |

OTHER PUBLICATIONS

Randall, J.C., "UC NMR in Polymer Quantitative Analyses", Am. Chem. Soc., Washington, D.C., 1984, Ch. 9.
Karjala et al., "Detection of Low Levels of Long-chain Branching in Polyolefins", Annual Technical Conference—Society of Plastics Engineers, 2008, 66th 887-891.
International Search Report and Written Opinion pertaining to PCT/US2018/051704, dated Jan. 2, 2019.
Bovey, "NMR and Macromolecules", ACS Symposium series, Randall, J., 1984.
Williams and Ward, J. Polym. Sci., Polym. Letters, 6, 621 (1968).

* cited by examiner

THERMOFORMED FILM COMPOSITIONS WITH ENHANCED TOUGHNESS AFTER THERMOFORMING PROCESSES

CROSS-REFERENCE TO RELATED APPLICATIONS

This application is a National Stage Entry under 35 U.S.C. § 371 of International Patent Application No. PCT/US2018/051704, filed Sep. 19, 2018, which claims priority to U.S. Provisional Application Ser. No. 62/561,833 filed Sep. 22, 2017, the entire disclosures of which are hereby incorporated by reference.

TECHNICAL FIELD

Embodiments described herein relate generally to thermoformed film compositions, and more particularly relate to thermoformed film compositions which are imparted with enhanced toughness due to the thermoforming process.

BACKGROUND

Thermoforming is one of the most frequently used film-forming techniques in many packaging applications. In the process, the film is heated and formed, still solid state, to a specific shape in a mold; then the product is added and finally the lidding film is sealed on the top. The thermoforming film structure needs to meet different requirements in order to fulfill the stages of the process and the end use. As sharp products can be packed a very good puncture resistance is needed.

Moreover, in order to hold heavy products a certain amount of stiffness is needed but must be balanced with high toughness to protect food products that are packaged inside. Also of importance is improving low temperature resistance as many products are frozen to protect the shelf life.

That said, many of the toughness properties of conventional polymer compositions are weakened due to the thermoforming process.

Accordingly, there is a need for improved thermoformable compositions which not only maintain, but improve the toughness properties after thermoforming.

SUMMARY

The present compositions meet these needs by providing improved toughness after thermoforming. After thermoforming, the present compositions demonstrated improved puncture resistance, improved dart performance, and improved stiffness.

According to at least one embodiment of the present disclosure, a thermoformed multilayer film structure is provided. The thermoformed multilayer film comprises a core layer and at least two outer layers disposed externally relative to the core layer. At least one layer of the thermoformed multilayer film structure comprises a first composition comprising at least one ethylene-based polymer, wherein the first composition comprises a Molecular Weighted Comonomer Distribution Index (MWCDI) value greater than 0.9, and a melt index ratio ($I_{10}/I_2$) that meets the following equation: $I_{10}/I_2 \geq 7.0 - 1.2 \times \log(I_2)$.

According to another embodiment, a thermoformed monolayer film structure is provided. The thermoformed monolayer film structure comprises the first composition. The thermoformed monolayer film demonstrates an increase in puncture resistance of at least 10% due to thermoforming applications.

These and other embodiments are described in more detail in the following Detailed Description.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
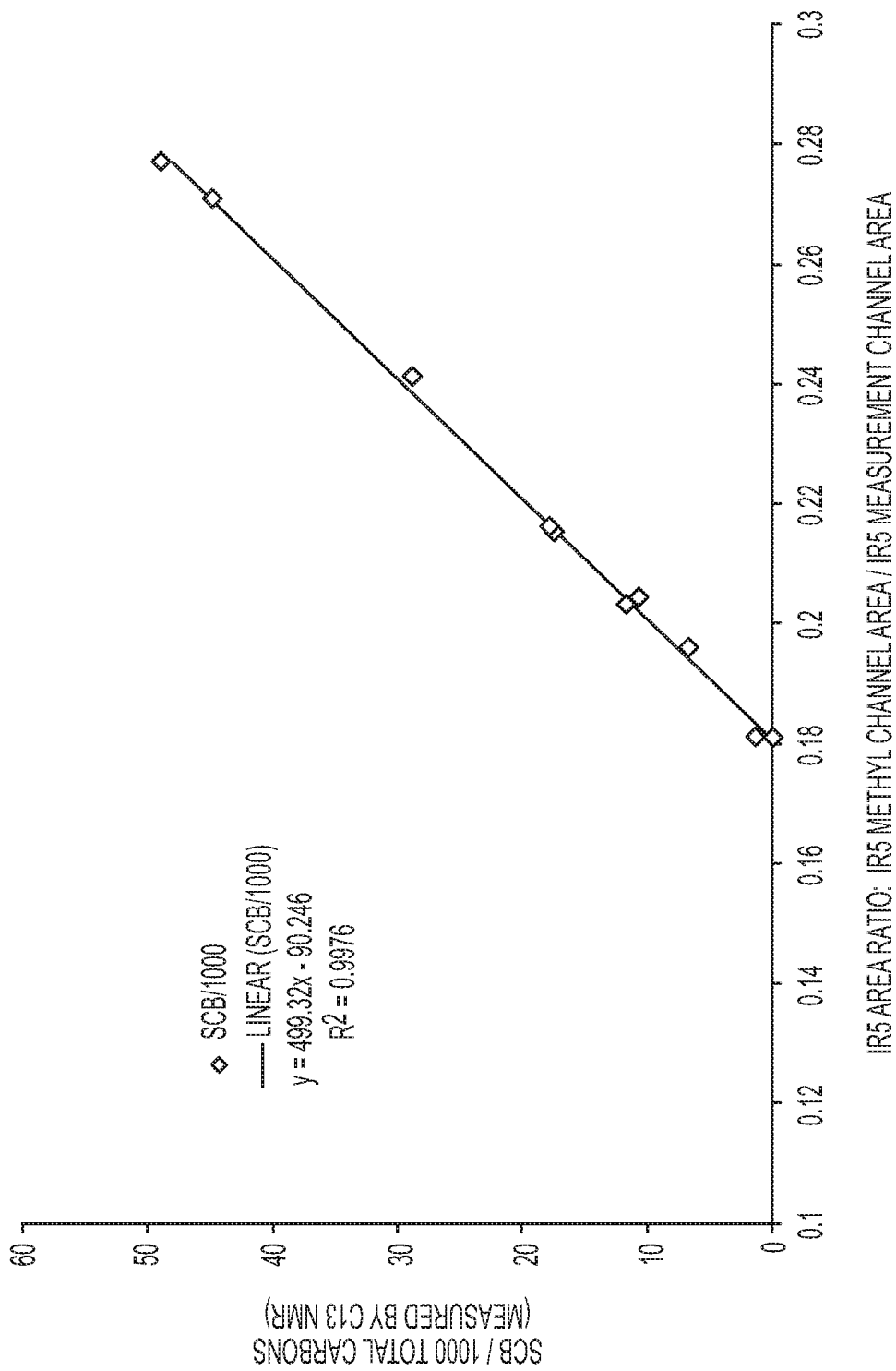
FIG. 1 depicts the plot of "$SCB_f$ versus IR5 Area Ratio" for ten SCB Standards.

Specific embodiments of the present application will now be described. The disclosure may, however, be embodied in different forms and should not be construed as limited to the embodiments set forth in this disclosure. Rather, these embodiments are provided so that this disclosure will be thorough and complete, and will fully convey the scope of the subject matter to those skilled in the art.

Definitions

The term "polymer" refers to a polymeric compound prepared by polymerizing monomers, whether of the same or a different type. The generic term polymer thus embraces the term "homopolymer," usually employed to refer to polymers prepared from only one type of monomer as well as "copolymer" which refers to polymers prepared from two or more different monomers. The term "interpolymer," as used herein, refers to a polymer prepared by the polymerization of at least two different types of monomers. The generic term interpolymer thus includes copolymers, and polymers prepared from more than two different types of monomers, such as terpolymers.

"Polyethylene" or "ethylene-based polymer" shall mean polymers comprising greater than 50% by weight of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE).

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.935 g/cm.

The term "LLDPE", includes resin made using Ziegler-Natta catalyst systems as well as resin made using single-site catalysts, including, but not limited to, bis-metallocene catalysts (sometimes referred to as "m-LLDPE") and constrained geometry catalysts, and resin made using post-metallocene, molecular catalysts. LLDPE includes linear, substantially linear or heterogeneous polyethylene copolymers or homopolymers. LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or 5,854,045). The LLDPE resins can be made via gas-phase, solution-phase or slurry polymerization or any combination thereof, using any type of reactor or reactor configuration known in the art.

The term "MDPE" refers to polyethylenes having densities from 0.926 to 0.935 g/cc. "MDPE" is typically made using chromium or Ziegler-Natta catalysts or using single-site catalysts including, but not limited to, bis-metallocene catalysts and constrained geometry catalysts.

The term "HDPE" refers to polyethylenes having densities greater than about 0.935 g/cc, which are generally prepared with Ziegler-Natta catalysts, chrome catalysts or single-site catalysts including, but not limited to, bis-metallocene catalysts and constrained geometry catalysts.

The term "ULDPE" refers to polyethylenes having densities of 0.880 to 0.912 g/cc, which are generally prepared with Ziegler-Natta catalysts, single-site catalysts including, but not limited to, bis-metallocene catalysts and constrained geometry catalysts, and post-metallocene, molecular catalysts. The term "propylene-based polymer," as used herein, refers to a polymer that comprises, in polymerized form, refers to polymers comprising greater than 50% by weight of units which have been derived from propylene monomer. This includes propylene homopolymer, random copolymer polypropylene, impact copolymer polypropylene, propylene/α-olefin interpolymer, and propylene/α-olefin copolymer. These polypropylene materials are generally known in the art.

"Multilayer structure" means any structure having more than one layer. For example, the multilayer structure may have two, three, four, five or more layers. A multilayer structure may be described as having the layers designated with letters. For example, a three layer structure having a core layer B, and two external layers A and C may be designated as A/B/C. Likewise, a structure having two core layers B and C and two external layers A and D would be designated A/B/C/D. In some embodiments, a multilayer film of the present invention comprises up to 11 layers.

Reference will now be made in detail to monolayer and multilayer film structures embodiments of the present disclosure, wherein the monolayer structure or multilayer film structure comprises a first composition comprising at least one ethylene-based polymer, wherein the first composition comprises a Molecular Weighted Comonomer Distribution Index (MWCDI) value greater than 0.9, and a melt index ratio $(I_{10}/I_2)$ that meets the following equation: $I_{10}/I_2 \geq 7.0 - 1.2 \times \log (I_2)$.

Embodiments of the multilayer film structure comprise a core layer and at least two outer layers disposed externally relative to the core layer. At least one layer of the multilayer film structure comprises the first composition. The first composition may be in multiple layers of the multilayer film. For example, the first composition may be present in the core layer, in layers external to the core layer, or combinations thereof.

First Composition

Various properties contribute to the improved toughness of the first composition. For example, the first composition has a superior comonomer distribution, which is significantly higher in comonomer concentration in the high molecular weight polymer molecules, and is significantly lower in comonomer concentration in the low molecular weight polymer molecules, as compared to conventional polymers of the art at the same overall density. It has also been discovered that the first composition has low LCB (Long Chain Branches), as indicated by low ZSVR, as compared to conventional polymers. As the result of this distribution of the comonomer, as well as the low LCB nature, the first composition has more tie chains, and thus improved film toughness.

As discussed above, the first composition comprises a MWCDI value greater than 0.9. In one embodiment, the first composition has an MWCDI value less than, or equal to, 10.0, further less than, or equal to, 8.0, further less than, or equal to, 6.0. In another embodiment, the first composition has an MWCDI value less than, or equal to, 5.0, further less than, or equal to, 4.0, further less than, or equal to, 3.0. In yet another embodiment, the first composition has an MWCDI value greater than, or equal to, 1.0, further greater than, or equal to, 1.1, further greater than, or equal to, 1.2. In a further embodiment, the first composition has an MWCDI value greater than, or equal to, 1.3, further greater than, or equal to, 1.4, further greater than, or equal to, 1.5.

The first composition has a melt index ratio $(I_{10}/I_2)$ that meets the following equation: $I_{10}/I_2 \geq 7.0 - 1.2 \times \log (I_2)$. In yet another embodiment, the first composition has a melt index ratio $I_{10}/I_2$ greater than, or equal to, 7.0, further greater than, or equal to, 7.1, further greater than, or equal to, 7.2, further greater than, or equal to, 7.3. In one embodiment, the first composition has a melt index ratio $I_{10}/I_2$ less than, or equal to, 9.2, further less than, or equal to, 9.0, further less than, or equal to, 8.8, further less than, or equal to, 8.5.

In one embodiment, the first composition has a ZSVR value from 1.2 to 3.0, or from 1.2 to 2.5, or from 1.2 to 2.0.

In yet another embodiment, the first composition has a vinyl unsaturation level greater than 10 vinyls per 1,000,000 total carbons. For example, greater than 20 vinyls per 1,000,000 total carbons, or greater than 50 vinyls per 1,000,000 total carbons, or greater than 70 vinyls per 1,000,000 total carbons, or greater than 100 vinyls per 1,000,000 total carbons. Vinyl unsaturation is calculated using the nuclear magnetic resonance (NMR) spectroscopy defined below.

In one embodiment, the first composition has a density in the range of 0.900 g/cc to 0.960 g/cm$^3$, or from 0.910 to 0.940 g/cm$^3$, or from 0.910 to 0.930, or from 0.910 to 0.925 g/cm$^3$. For example, the density can be from a lower limit of 0.910, 0.912, or 0.914 g/cm$^3$, to an upper limit of 0.925, 0.927, or 0.930 g/cm$^3$ (1 cm$^3$=1 cc).

In a further embodiment, the first composition has a melt index (I$_2$; at 190° C./2.16 kg) from 0.1 to 50 g/10 minutes, for example from 0.1 to 30 g/10 minutes, or from 0.1 to 20 g/10 minutes, or from 0.1 to 10 g/10 minutes. For example, the melt index (I$_2$; at 190° C./2.16 kg) can be from a lower limit of 0.1, 0.2, or 0.5 g/10 minutes, to an upper limit of 1.0, 2.0, 3.0, 4.0, 5.0, 10, 15, 20, 25, 30, 40, or 50 g/10 minutes.

In another embodiment, the first composition has a molecular weight distribution, expressed as the ratio of the weight average molecular weight to number average molecular weight ($M_w/M_n$) as determined by conventional Gel Permeation Chromatography (GPC) (conv. GPC) in the range of from 2.2 to 5.0. For example, the molecular weight distribution ($M_w/M_n$) can be from a lower limit of 2.2, 2.3, 2.4, 2.5, 3.0, 3.2, or 3.4, to an upper limit of 3.9, 4.0, 4.1, 4.2, 4.5, or 5.0.

In one embodiment, the first composition has a number average molecular weight ($M_n$) as determined by cony. GPC in the range from 10,000 to 50,000 g/mole. For example, the number average molecular weight can be from a lower limit of 10,000, 20,000, or 25,000 g/mole, to an upper limit of 35,000, 40,000, 45,000, or 50,000 g/mole. In another embodiment, the ethylene-based polymer has a weight average molecular weight ($M_w$) as determined by cony. GPC in the range from 70,000 to 200,000 g/mole. For example, the number average molecular weight can be from a lower limit of 70,000, 75,000, or 78,000 g/mole, to an upper limit of 120,000, 140,000, 160,000, 180,000 or 200,000 g/mole.

In one embodiment, the first composition has a melt viscosity ratio, Eta*0.1/Eta*100, in the range from 2.2 to 7.0, wherein Eta*0.1 is the dynamic viscosity computed at a shear rate of 0.1 rad/s and Eta*100 is the dynamic viscosity computed at shear rate of 100 rad/s. Further details on the melt viscosity ratio and dynamic viscosity calculations are provided below.

In one embodiment, the ethylene-based polymer of the first composition is an ethylene/α-olefin interpolymer, and further an ethylene/α-olefin copolymer. The α-olefin may have less than, or equal to, 20 carbon atoms. For example, the α-olefin comonomers may have 3 to 10 carbon atoms, or from 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-butene, 1-hexene and 1-octene, and further 1-hexene and 1-octene.

The ethylene-based polymers may comprise less than 20 percent by weight of units derived from one or more α-olefin comonomers. All individual values and subranges from less than 18 weight percent are included herein and disclosed herein; for example, the ethylene-based polymers may comprise from less than 15 percent by weight of units derived from one or more α-olefin comonomers; or in the alternative, less than 10 percent by weight of units derived from one or more α-olefin comonomers; or in the alternative, from 1 to 20 percent by weight of units derived from one or more α-olefin comonomers; or in the alternative, from 1 to 10 percent by weight of units derived from one or more α-olefin comonomers.

Conversely, the ethylene-based polymers may comprise at least 80 percent by weight of units derived from ethylene. All individual values and subranges from at least 80 weight percent are included herein and disclosed herein; for example, the ethylene-based polymers may comprise at least 82 percent by weight of units derived from ethylene; or in the alternative, at least 85 percent by weight of units derived from ethylene; or in the alternative, at least 90 percent by weight of units derived from ethylene; or in the alternative, from 80 to 100 percent by weight of units derived from ethylene; or in the alternative, from 90 to 100 percent by weight of units derived from ethylene.

Optionally, the first composition further may comprise a second ethylene-based polymer. In a further embodiment, the second ethylene-based polymer is an ethylene/α-olefin interpolymer, and further an ethylene/α-olefin copolymer, or an LDPE. Suitable α-olefin comonomers are listed above.

In one embodiment, the second ethylene-based polymer is a heterogeneously branched ethylene/α-olefin interpolymer, and further a heterogeneously branched ethylene/α-olefin copolymer. Heterogeneously branched ethylene/α-olefin interpolymers and copolymers are typically produced using Ziegler/Natta type catalyst system, and have more comonomer distributed in the lower molecular weight molecules of the polymer.

In one embodiment, the second ethylene-based polymer has a molecular weight distribution ($M_w/M_n$) in the range from 3.0 to 5.0, for example from 3.2 to 4.6. For example, the molecular weight distribution ($M_w/M_n$) can be from a lower limit of 3.2, 3.3, 3.5, 3.7, or 3.9, to an upper limit of 4.6, 4.7, 4.8, 4.9, or 5.0.

In one embodiment, the composition further comprises another polymer. In a further embodiment, the polymer is selected from the following: a LLDPE, a MDPE, a LDPE, a HDPE, a propylene-based polymer, or a combination thereof.

In one embodiment, the first composition further comprises a LDPE. In a further embodiment, the LDPE is present in an amount from 5 to 50 wt %, further from 10 to 40 wt %, further from 15 to 30 wt %, based on the weight of the composition. In a further embodiment, the LDPE has a density from 0.915 to 0.925 g/cc, and a melt index (I$_2$) from 0.5 to 5 g/10 min, further from 1.0 to 3.0 g/10 min.

In further embodiments, the first composition may comprise one or more additives. Additives include, but are not limited to, antistatic agents, color enhancers, dyes, lubricants, fillers (for example, TiO$_2$ or CaCO$_3$), opacifiers, nucleators, processing aids, pigments, primary anti-oxidants, secondary anti-oxidants, UV stabilizers, anti-block agents, slip agents, tackifiers, fire retardants, anti-microbial agents, odor reducer agents, anti-fungal agents, and combinations thereof.

Additional Components of Thermoformed Films

Additionally, in one or more embodiments, the thermoformed multilayer film may comprise propylene-based polymers. Various propylene based polymer products are considered suitable, for example, propylene-ethylene copolymer resins such as VERSIFY™ 3000 or 3200, which are both supplied by The Dow Chemical Company, Midland, Mich. In some embodiments, the thermoformed multilayer film structure is substantially free of propylene-based polymers. As used herein, "substantially free of propylene-based polymers" means less than 0.5% by weight of the thermoformed multilayer film, or less than 0.1% by weight, or less than 0.01% by weight.

Moreover, in further embodiments, the thermoformed monolayer or multilayer film structures consist essentially of ethylene-based polymers. As used herein, "consists essentially" means that the thermoformed monolayer or multilayer film structure may include other additives but is limited to ethylene-based polymer.

The thermoformed monolayer or multilayer film structures may include additional ethylene-based polymers besides the ethylene-based polymer of the first composition. In one embodiment, the thermoformed multilayer film structure may comprise ethylene-based polymer having a density of from 0.895 to 0.965 g/cm$^3$ and a melt index ($I_2$) from 0.5 to 6.0 g/10 min when measured according to ASTM D 1238 at a load of 2.16 kg and temperature of 190° C. In further embodiments, the density may be from 0.900 to 0.940 g/cm$^3$, or from 0.900 to 0.925 g/cm$^3$, and the melt index ($I_2$) is from 0.85 to 3.5 g/10 min, or from 2.0 to 6.0 g/10 min. Examples of may include, but are not limited to, DOW™ low density polyethylenes (LDPE) and linear low density polyethylenes (LLDPE), DOWLEX™ linear low density polyethylenes (LLDPE), ATTANE™ ultra low density polyethylenes (ULDPE), ELITE™ enhanced polyethylenes, each being commercially available from The Dow Chemical Company, Midland, Mich.

In further embodiments, the thermoformed multilayer film may comprise additional compositions in one or more of the layers. In some embodiments, a multilayer film of the present disclosure can comprise one or more barrier layers. In such embodiments, the barrier layer may comprise one or more polyamides (nylons), ethylene vinyl alcohol copolymers (EVOH), and/or malleated polyolefins. EVOH can include a vinyl alcohol copolymer having 27 to 44 mol % ethylene, and is prepared by, for example, hydrolysis of vinyl acetate copolymers. Examples of commercially available EVOH that can be used in embodiments of the present invention include EVAL™ from Kuraray and Noltex™ from Nippon Goshei. In embodiments where the barrier layer comprises polyamide, the polyamide can include polyamide 6, polyamide 9, polyamide 10, polyamide 11, polyamide 12, polyamide 6,6, polyamide 6/66 and aromatic polyamide such as polyamide 6I, polyamide 6T, MXD6, or combinations thereof.

The malleated polyolefins are contemplated for various layers of the thermoformed multilayer film. In some embodiments, the malleated polyolefins may be in a tie layer of the thermoformed multilayer film. The malleated polyolefins may comprise maleic anhydride grafted polyethylene, or maleic anhydride grafted polypropylene. Suitable commercial examples of the maleic anhydride grafted polyethylene is AMPLIFY™ TY 1057H from The Dow Chemical Company (Midland, Mich.).

In other embodiments, the multilayer or monolayer films can be free of polyamide. In some such embodiments, the absence of polyamide can result in a less expensive multilayer film with thermoforming properties comparable to multilayer films comprising polyamide. In some embodiments, a multilayer film can comprise less than 5 weight percent polyamide, or less than 3 weight percent polyamide, or less than 1 weight percent polyamide, or less than 0.5 weight percent polyamide, each based on the total weight of the film. However, as indicated above, there are some embodiments (e.g., when polyamide is to be used as a barrier layer), where a multilayer film includes larger amounts of polyamide.

In some embodiments, the multilayer films can include a tie layer. A tie layer may be used to adhere two layers together during coextrusion particularly where there is an incompatibility between the compositions of the two layers. For example, if a multilayer film comprises an ethylene vinyl alcohol barrier layer, a tie layer may be used to adhere the ethylene vinyl alcohol layer to a layer comprising predominantly polyolefins. Persons of skill in the art can determine whether a tie layer is needed and if so, select an appropriate tie layer, depending on the composition of the layers to be included in the multilayer film based on the teachings herein.

It should be understood that any of the layers within a multilayer film of the present invention can further comprise one or more additives as known to those of skill in the art such as, for example, antioxidants, ultraviolet light stabilizers, thermal stabilizers, slip agents, antiblock, pigments or colorants, processing aids, crosslinking catalysts, flame retardants, fillers and foaming agents.

Multilayer or monolayer films of the present disclosure may have a total thickness (before thermoforming) in the range of from 10 µm to 250 µm, preferably 50 µm to 200 µm, or 100 µm to 180 µm. Individual layer thickness may vary depending on the number of layers available, the type of layer (e.g., skin layer, barrier layer, inner layer, etc.) and the total thickness of the film. Multilayer films of the present disclosure can be coextruded (e.g., using a blown film process or a cast film process) in some embodiments using techniques known to those of skill in the art. Multilayer, collapsed or monolayer films of the present disclosure are well-suited for use in thermoforming applications in some embodiments. In one or more embodiments, the multilayer film may comprise at least 50% based on the percentage overall multilayer film thickness of the first composition. In another embodiment, the multilayer film may comprise at least 60% based on the percentage overall multilayer film thickness of the first composition.

The present multilayer and monolayer films can be formed into a variety of articles using techniques known to those of skill in the art. For example, the monolayer and multilayer films can be thermoformed into an article in some embodiments. Examples of such articles include rigid containers, flexible trays, and semi-flexible packaging. Such articles can be used, for example, in the packaging of foods such as fruit, cheese, meat, processed meat, processed food, and frozen food.

Properties of Monolayer and Multilayer Films

The thermoformed monolayer film may demonstrate an increase in puncture resistance of at least 10% due to thermoforming. In further embodiments, the thermoformed monolayer film may demonstrate an increase in puncture resistance of at least 15%, or at least 20% due to the thermoforming step.

Additionally, the thermoformed polyolefin multilayer film structure may also demonstrate improved properties. For instance, the thermoformed polyolefin multilayer film may have an Instrumented Dart Impact of at least 0.6 J, or at least 0.8 J, or at least 1.0 J when measured according to ASTM D3763.

Polymerization Process for Making the First Composition

To produce the ethylene based polymer of the first composition, suitable polymerization processes may include, but are not limited to, solution polymerization processes, using one or more conventional reactors, e.g., loop reactors, isothermal reactors, adiabatic reactors, stirred tank reactors, autoclave reactors in parallel, series, and/or any combinations thereof. The ethylene based polymer compositions may, for example, be produced via solution phase polymerization processes, using one or more loop reactors, adiabatic reactors, and combinations thereof.

In general, the solution phase polymerization process occurs in one or more well mixed reactors, such as one or more loop reactors and/or one or more adiabatic reactors at a temperature in the range from 115 to 250° C.; for example, from 135 to 200° C., and at pressures in the range of from 300 to 1000 psig, for example, from 450 to 750 psig.

In one embodiment, the ethylene based polymer may be produced in two loop reactors in series configuration, the first reactor temperature is in the range from 115 to 200° C., for example, from 135 to 165° C., and the second reactor temperature is in the range from 150 to 210° C., for example, from 185 to 200° C. In another embodiment, the ethylene based polymer composition may be produced in a single reactor, the reactor temperature is in the range from 115 to 200° C., for example from 130 to 190° C. The residence time in a solution phase polymerization process is typically in the range from 2 to 40 minutes, for example from 5 to 20 minutes. Ethylene, solvent, one or more catalyst systems, optionally one or more cocatalysts, and optionally one or more comonomers, are fed continuously to one or more reactors. Exemplary solvents include, but are not limited to, isoparaffins. For example, such solvents are commercially available under the name ISOPAR E from ExxonMobil Chemical. The resultant mixture of the ethylene based polymer composition and solvent is then removed from the reactor or reactors, and the ethylene based polymer composition is isolated. Solvent is typically recovered via a solvent recovery unit, i.e., heat exchangers and separator vessel, and the solvent is then recycled back into the polymerization system.

In one embodiment, the ethylene based polymer of the first composition may be produced, via a solution polymerization process, in a dual reactor system, for example a dual loop reactor system, wherein ethylene, and optionally one or more α-olefins, are polymerized in the presence of one or more catalyst systems, in one reactor, to produce a first ethylene-based polymer, and ethylene, and optionally one or more α-olefins, are polymerized in the presence of one or more catalyst systems, in a second reactor, to produce a second ethylene-based polymer. Additionally, one or more cocatalysts may be present.

In another embodiment, the ethylene based polymer may be produced via a solution polymerization process, in a single reactor system, for example, a single loop reactor system, wherein ethylene, and optionally one or more α-olefins, are polymerized in the presence of one or more catalyst systems. Additionally, one or more cocatalysts may be present.

As discussed above, the invention provides a process to form a composition comprising at least two ethylene-based polymers, said process comprising the following: polymerizing ethylene, and optionally at least one comonomer, in solution, in the present of a catalyst system comprising a metal-ligand complex of Structure I, to form a first ethylene-based polymer; and polymerizing ethylene, and optionally at least one comonomer, in the presence of a catalyst system comprising a Ziegler/Natta catalyst, to form a second ethylene-based polymer; and wherein Structure I is as follows:

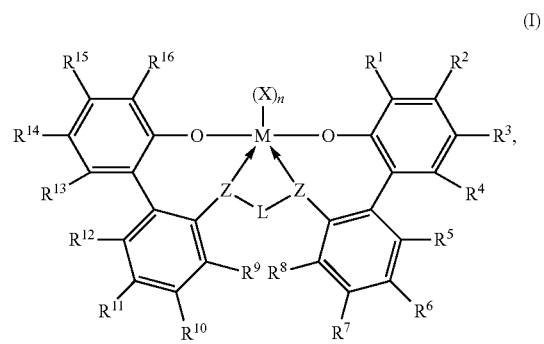

(I)

wherein:

M is titanium, zirconium, or hafnium, each, independently, being in a formal oxidation state of +2, +3, or +4; and n is an integer from 0 to 3, and wherein when n is 0, X is absent; and each X, independently, is a monodentate ligand that is neutral, monoanionic, or dianionic; or two Xs are taken together to form a bidentate ligand that is neutral, monoanionic, or dianionic; and X and n are chosen, in such a way, that the metal-ligand complex of formula (I) is, overall, neutral; and each Z, independently, is O, S, N($C_1$-$C_{40}$)hydrocarbyl, or P($C_1$-$C_{40}$)hydrocarbyl; and wherein the Z-L-Z fragment is comprised of formula (1):

(1)

$R^1$ through $R^{16}$ are each, independently, selected from the group consisting of the following: a substituted or unsubstituted ($C_1$-$C_{40}$)hydrocarbyl, a substituted or unsubstituted ($C_1$-$C_{40}$)heterohydrocarbyl, Si($R^C$)$_3$, Ge($R^C$)$_3$, P($R^P$)$_2$, N($R^N$)$_2$, O$R^C$, S$R^C$, NO$_2$, CN, CF$_3$, $R^C$S(O)—, $R^C$S(O)$_2$—, ($R^C$)$_2$C=N—, $R^C$C(O)O—, $R^C$OC(O)—, $R^C$C(O)N(R)—, ($R^C$)$_2$NC(O)—, halogen atom, hydrogen atom; and wherein each $R^C$ is independently a ($C_1$-$C_{30}$)hydrocarbyl; $R^P$ is a (C1-C30)hydrocarbyl; and $R^N$ is a (C1-C30)hydrocarbyl; and wherein, optionally, two or more R groups (from $R^1$ through $R^{16}$) can combine together into one or more ring structures, with such ring structures each, independently, having from 3 to 50 atoms in the ring, excluding any hydrogen atom.

The process may comprise a combination of two or more embodiments as described herein. In one embodiment, the process comprises polymerizing ethylene, and optionally at least one α-olefin, in solution, in the presence of a catalyst system comprising a metal-ligand complex of Structure I, to form a first ethylene-based polymer; and polymerizing ethylene, and optionally at least one α-olefin, in the presence of a catalyst system comprising a Ziegler/Natta catalyst, to form a second ethylene-based polymer. In a further embodiment, each α-olefin is independently a $C_1$-$C_8$ α-olefin.

In one embodiment, optionally, two or more R groups from $R^9$ through $R^{13}$, or $R^4$ through $R^8$ can combine together into one or more ring structures, with such ring structures each, independently, having from 3 to 50 atoms in the ring, excluding any hydrogen atom.

In one embodiment, M is hafnium.

In one embodiment, $R^3$ and $R^{14}$ are each independently an alkyl, and further a $C_1$-$C_3$ alkyl, and further methyl.

In one embodiment, $R^1$ and $R^{16}$ are each as follows:

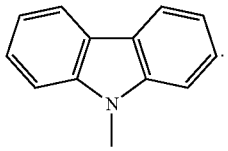

In one embodiment, each of the aryl, heteroaryl, hydrocarbyl, heterohydrocarbyl, $Si(R^C)_3$, $Ge(R^C)_3$, $P(R^P)_2$, N $(R^N)_2$, $OR^C$, $SR^C$, $R^CS(O)$—, $R^CS(O)_2$—, $(R^C)_2C$=N—, $R^CC(O)O$—, $R^COC(O)$—, $R^CC(O)N(R)$—, $(R^C)_2NC(O)$—, hydrocarbylene, and heterohydrocarbylene groups, independently, is unsubstituted or substituted with one or more $R^S$ substituents; and each $R^S$ independently is a halogen atom, polyfluoro substitution, perfluoro substitution, unsubstituted $(C_1$-$C_{18})$alkyl, $F_3C$—, $FCH_2O$—, $F_2HCO$—, $F_3CO$—, $R_3Si$—, $R_3Ge$—, RO—, RS—, RS(O)—, $RS(O)_2$—, $R_2P$—, $R_2N$—, $R_2C$=N—, NC—, $R^C$ (O)O, ROC(O)—, $R^C(O)N$ (R)—, or $R_2NC(O)$—, or two of the $R^S$ are taken together to form an unsubstituted $(C_1$-$C_{18})$alkylene, wherein each R independently is an unsubstituted $(C_1$-$C_{18})$alkyl.

In one embodiment, two or more of $R^1$ through $R^{16}$ do not combine to form one or more ring structures.

In one embodiment, the catalyst system suitable for producing the first ethylene/α-olefin interpolymer is a catalyst system comprising bis((2-oxoyl-3-(dibenzo-1H-pyrrole-1-yl)-5-(methyl)phenyl)-2-phenoxymethyl)-methylene-1,2-cyclohexanediylhafnium (IV) dimethyl, represented by the following Structure: IA:

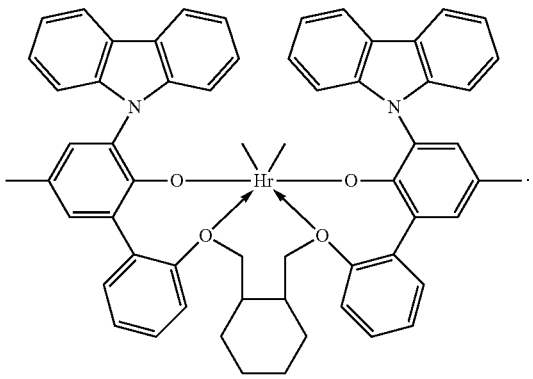

(IA)

The Ziegler/Natta catalysts suitable for use in the invention are typical supported, Ziegler-type catalysts, which are particularly useful at the high polymerization temperatures of the solution process. Examples of such compositions are those derived from organomagnesium compounds, alkyl halides or aluminum halides or hydrogen chloride, and a transition metal compound. Examples of such catalysts are described in U.S. Pat. Nos. 4,612,300; 4,314,912; and 4,547,475; the teachings of which are incorporated herein by reference.

Particularly suitable organomagnesium compounds include, for example, hydrocarbon soluble dihydrocarbylmagnesium, such as the magnesium dialkyls and the magnesium diaryls. Exemplary suitable magnesium dialkyls include, particularly, n-butyl-sec-butylmagnesium, diisopropylmagnesium, di-n-hexylmagnesium, isopropyl-n-butyl-magnesium, ethyl-n-hexyl-magnesium, ethyl-n-butylmagnesium, di-n-octylmagnesium, and others, wherein the alkyl has from 1 to 20 carbon atoms. Exemplary suitable magnesium diaryls include diphenylmagnesium, dibenzylmagnesium and ditolylmagnesium. Suitable organomagnesium compounds include alkyl and aryl magnesium alkoxides and aryloxides and aryl and alkyl magnesium halides, with the halogen-free organomagnesium compounds being more desirable.

Halide sources include active non-metallic halides, metallic halides, and hydrogen chloride. Suitable non-metallic halides are represented by the formula R'X, wherein R' is hydrogen or an active monovalent organic radical, and X is a halogen. Particularly suitable non-metallic halides include, for example, hydrogen halides and active organic halides, such as t-alkyl halides, allyl halides, benzyl halides and other active hydrocarbyl halides. By an active organic halide is meant a hydrocarbyl halide that contains a labile halogen at least as active, i.e., as easily lost to another compound, as the halogen of sec-butyl chloride, preferably as active as t-butyl chloride. In addition to the organic monohalides, it is understood that organic dihalides, trihalides and other polyhalides that are active, as defined hereinbefore, are also suitably employed. Examples of preferred active non-metallic halides, include hydrogen chloride, hydrogen bromide, t-butyl chloride, t-amyl bromide, allyl chloride, benzyl chloride, crotyl chloride, methylvinyl carbinyl chloride, a-phenylethyl bromide, diphenyl methyl chloride, and the like. Most preferred are hydrogen chloride, t-butyl chloride, allyl chloride and benzyl chloride.

Suitable metallic halides include those represented by the formula $MR_{y-a} X_a$, wherein: M is a metal of Groups IIB, IIIA or IVA of Mendeleev's periodic Table of Elements; R is a monovalent organic radical; X is a halogen; y has a value corresponding to the valence of M; and "a" has a value from 1 to y. Preferred metallic halides are aluminum halides of the formula $AlR_{3-a} X_a$, wherein each R is independently hydrocarbyl, such as alkyl; X is a halogen; and a is a number from 1 to 3. Most preferred are alkylaluminum halides, such as ethylaluminum sesquichloride, diethylaluminum chloride, ethylaluminum dichloride, and diethylaluminum bromide, with ethylaluminum dichloride being especially preferred. Alternatively, a metal halide, such as aluminum trichloride, or a combination of aluminum trichloride with an alkyl aluminum halide, or a trialkyl aluminum compound may be suitably employed.

Any of the conventional Ziegler-Natta transition metal compounds can be usefully employed, as the transition metal component in preparing the supported catalyst component. Typically, the transition metal component is a compound of a Group IVB, VB, or VIB metal. The transition metal component is generally, represented by the formulas: $TrX'_{4-q}$ (OR1)q, $TrX'_{4-q}$ (R2)q, $VOX'_3$ and $VO(OR)_3$.

Tr is a Group IVB, VB, or VIB metal, preferably a Group IVB or VB metal, preferably titanium, vanadium or zirconium; q is 0 or a number equal to, or less than, 4; X' is a halogen, and R1 is an alkyl group, aryl group or cycloalkyl group having from 1 to 20 carbon atoms; and R2 is an alkyl group, aryl group, aralkyl group, substituted aralkyls, and the like.

The aryl, aralkyls and substituted aralkys contain 1 to 20 carbon atoms, preferably 1 to 10 carbon atoms. When the transition metal compound contains a hydrocarbyl group, R2, being an alkyl, cycloalkyl, aryl, or aralkyl group, the hydrocarbyl group will preferably not contain an H atom in the position beta to the metal carbon bond. Illustrative, but non-limiting, examples of aralkyl groups are methyl, neopentyl, 2,2-dimethylbutyl, 2,2-dimethylhexyl; aryl groups such as benzyl; cycloalkyl groups such as 1-norbornyl. Mixtures of these transition metal compounds can be employed if desired.

Illustrative examples of the transition metal compounds include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_6H_{13})_2Cl_2$, $Ti(OC_8H_{17})_2Br_2$, and $Ti(OC_{12}H_{25})Cl_3$, $Ti(O-iC_3H_7)_4$, and $Ti(O-nC_4H_9)_4$. Illustrative examples of vanadium compounds include $VCl_4$, $VOCl_3$, $VO(OC_2H_5)_3$, and $VO(OC_4H_9)_3$. Illustrative examples of zirconium compounds include $ZrCl_4$, $ZrCl_3(OC_2H_5)$, $ZrCl_2(OC_2H_5)_2$, $ZrCl(OC_2H_5)_3$, $Zr(OC_2H_5)_4$, $ZrCl_3(OC_4H_9)$, $ZrCl_2(OC_4H_9)_2$, and $ZrCl(OC_4H_9)_3$.

An inorganic oxide support may be used in the preparation of the catalyst, and the support may be any particulate oxide, or mixed oxide which has been thermally or chemically dehydrated, such that it is substantially free of adsorbed moisture. See U.S. Pat. Nos. 4,612,300; 4,314,912; and 4,547,475; the teachings of which are incorporated herein by reference.

The above described catalyst systems can be rendered catalytically active by contacting it to, or combining it with, the activating co-catalyst, or by using an activating technique, such as those known in the art, for use with metal-based olefin polymerization reactions. Suitable activating co-catalysts, for use herein, include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Aluminoxanes and their preparations are known at, for example, U.S. Pat. No. 6,103,657. Examples of preferred polymeric or oligomeric alumoxanes are methylalumoxane, triisobutylaluminum-modified methylalumoxane, and isobutylalumoxane.

Exemplary Lewis acid activating co-catalysts are Group 13 metal compounds containing from 1 to 3 hydrocarbyl substituents as described herein. In some embodiments, exemplary Group 13 metal compounds are tri(hydrocarbyl)-substituted-aluminum or tri(hydrocarbyl)-boron compounds. In some other embodiments, exemplary Group 13 metal compounds are tri(hydrocarbyl)-substituted-aluminum or tri(hydrocarbyl)-boron compounds are tri($(C_1-C_{10})$ alkyl)aluminum or tri($(C_6-C_{18})$aryl)boron compounds and halogenated (including perhalogenated) derivatives thereof. In some other embodiments, exemplary Group 13 metal compounds are tris(fluoro-substituted phenyl)boranes, in other embodiments, tris(pentafluorophenyl)borane. In some embodiments, the activating co-catalyst is a tris($(C_1-C_{20})$ hydrocarbyl) borate (e.g., trityl tetrafluoroborate) or a tri$((C_1-C_{20})$hydrocarbyl)ammonium tetra$((C_1-C_{20})$hydrocarbyl)borane (e.g., bis(octadecyl)methylammonium tetrakis (pentafluorophenyl)borane). As used herein, the term "ammonium" means a nitrogen cation that is a $((C_1-C_{20})$hydrocarbyl$)_4N^+$, a $((C_1-C_{20})$hydrocarbyl$)_3N(H)^+$, a $((C_1-C_{20})$hydrocarbyl$)_2N(H)_2^+$, $(C_1-C_{20})$hydrocarbyl$N(H)_3^+$, or $N(H)_4^+$, wherein each $(C_1-C_{20})$hydrocarbyl may be the same or different.

Exemplary combinations of neutral Lewis acid activating co-catalysts include mixtures comprising a combination of a tri$((C_1-C_4)$alkyl)aluminum and a halogenated tri$((C_6-C_{18})$ aryl)boron compound, especially a tris(pentafluorophenyl) borane. Other exemplary embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Exemplary embodiments ratios of numbers of moles of (metal-ligand complex): (tris(pentafluoro-phenylborane):(alumoxane) [e.g., (Group 4 metal-ligand complex):(tris(pentafluoro-phenylborane): (alumoxane)] are from 1:1:1 to 1:10:30, other exemplary embodiments are from 1:1:1.5 to 1:5:10.

Many activating co-catalysts and activating techniques have been previously taught, with respect to different metal-ligand complexes, in the following USPNs: U.S. Pat. Nos. 5,064,802; 5,153,157; 5,296,433; 5,321,106; 5,350,723; 5,425,872; 5,625,087; 5,721,185; 5,783,512; 5,883,204; 5,919,983; 6,696,379; and 7,163,907. Examples of suitable hydrocarbyloxides are disclosed in U.S. Pat. No. 5,296,433. Examples of suitable Bronsted acid salts for addition polymerization catalysts are disclosed in U.S. Pat. Nos. 5,064,802; 5,919,983; 5,783,512. Examples of suitable salts of a cationic oxidizing agent and a non-coordinating, compatible anion, as activating co-catalysts for addition polymerization catalysts, are disclosed in U.S. Pat. No. 5,321,106. Examples of suitable carbenium salts as activating co-catalysts for addition polymerization catalysts are disclosed in U.S. Pat. No. 5,350,723. Examples of suitable silylium salts, as activating co-catalysts for addition polymerization catalysts, are disclosed in U.S. Pat. No. 5,625,087. Examples of suitable complexes of alcohols, mercaptans, silanols, and oximes with tris(pentafluorophenyl)borane are disclosed in U.S. Pat. No. 5,296,433. Some of these catalysts are also described in a portion of U.S. Pat. No. 6,515,155 B1, beginning at column 50, at line 39, and going through column 56, at line 55, only the portion of which is incorporated by reference herein.

In some embodiments, the above described catalyst systems can be activated to form an active catalyst composition by combination with one or more cocatalyst, such as a cation forming cocatalyst, a strong Lewis acid, or a combination thereof. Suitable cocatalysts for use include polymeric or oligomeric aluminoxanes, especially methyl aluminoxane, as well as inert, compatible, noncoordinating, ion forming compounds. Exemplary suitable cocatalysts include, but are not limited to, modified methyl aluminoxane (MMAO), bis(hydrogenated tallow alkyl)methyl, tetrakis(pentafluorophenyl)borate(1-) amine, triethyl aluminum (TEA), and any combinations thereof.

In some embodiments, one or more of the foregoing activating co-catalysts are used in combination with each other. In one embodiment, a combination of a mixture of a tri$((C_1-C_4)$hydrocarbyl)aluminum, tri$((C_1-C_4)$hydrocarbyl) borane, or an ammonium borate with an oligomeric or polymeric alumoxane compound, can be used.

Testing Methods

The test methods include the following:

Melt Index ($I_2$)

Melt index ($I_2$) were measured in accordance to ASTM D-1238 at 190° C. at 2.16 kg. The values are reported in g/10 min, which corresponds to grams eluted per 10 minutes.

Density

Samples for density measurement were prepared according to ASTM D4703 and reported in grams/cubic centimeter (g/cc or g/cm³). Measurements were made within one hour of sample pressing using ASTM D792, Method B.

Dynamic Shear Rheology

Each sample was compression-molded into "3 mm thick× 25 mm diameter" circular plaque, at 177° C., for five minutes, under 10 MPa pressure, in air. The sample was then taken out of the press and placed on a counter top to cool.

Constant temperature, frequency sweep measurements were performed on an ARES strain controlled rheometer (TA Instruments), equipped with 25 mm parallel plates, under a nitrogen purge. For each measurement, the rheometer was thermally equilibrated, for at least 30 minutes, prior to zeroing the gap. The sample disk was placed on the plate, and allowed to melt for five minutes at 190° C. The plates were then closed to 2 mm, the sample trimmed, and then the test was started. The method had an additional five minute delay built in, to allow for temperature equilibrium. The experiments were performed at 190° C., over a frequency range from 0.1 to 100 rad/s, at five points per decade interval. The strain amplitude was constant at 10%. The stress response was analyzed in terms of amplitude and phase, from which the storage modulus (G'), loss modulus (G"), complex modulus (G*), dynamic viscosity (1*or Eta*), and tan δ (or tan delta) were calculated.

Melt Strength

Melt strength measurements were conducted on a Gottfert Rheotens 71.97 (Göettfert Inc.; Rock Hill, S.C.) attached to a Gottfert Rheotester 2000 capillary rheometer. A polymer melt was extruded through a capillary die with a flat entrance angle (180 degrees), with a capillary diameter of 2.0 mm, and an aspect ratio (capillary length/capillary diameter) of 15.

After equilibrating the samples at 190° C., for 10 minutes, the piston was run at a constant piston speed of 0.265 mm/second. The standard test temperature was 190° C. The sample (about 20 grams) was drawn uniaxially to a set of accelerating nips, located 100 mm below the die, with an acceleration of 2.4 mm/second². The tensile force was recorded, as a function of the take-up speed of the nip rolls. Melt strength was reported as the plateau force (cN) before the strand broke. The following conditions were used, in the melt strength measurements: plunger speed=0.265 mm/second; wheel acceleration=2.4 mm/s²; capillary diameter=2.0 mm; capillary length=30 mm; and barrel diameter=12 mm.

Conventional Gel Permeation Chromatography (Cony. GPC)

A GPC-IR high temperature chromatographic system from PolymerChar (Valencia, Spain), was equipped with a Precision Detectors (Amherst, Mass.), 2-angle laser light scattering detector Model 2040, an IR5 infra-red detector and a 4-capillary viscometer, both from PolymerChar. Data collection was performed using PolymerChar Instrument Control software and data collection interface. The system was equipped with an on-line, solvent degas device and pumping system from Agilent Technologies (Santa Clara, Calif.).

Injection temperature was controlled at 150 degrees Celsius. The columns used, were three, 10-micron "Mixed-B" columns from Polymer Laboratories (Shropshire, UK). The solvent used was 1,2,4-trichlorobenzene. The samples were prepared at a concentration of "0.1 grams of polymer in 50 milliliters of solvent." The chromatographic solvent and the sample preparation solvent each contained "200 ppm of butylated hydroxytoluene (BHT)." Both solvent sources were nitrogen sparged. Ethylene-based polymer samples were stirred gently at 160 degrees Celsius for three hours. The injection volume was "200 microliters,' and the flow rate was "1 milliliters/minute." The GPC column set was calibrated by running 21 "narrow molecular weight distribution" polystyrene standards. The molecular weight (MW) of the standards ranges from 580 to 8,400,000 g/mole, and the standards were contained in six "cocktail" mixtures. Each standard mixture had at least a decade of separation between individual molecular weights. The standard mixtures were purchased from Polymer Laboratories. The polystyrene standards were prepared at "0.025 g in 50 mL of solvent" for molecular weights equal to, or greater than, 1,000,000 g/mole, and at "0.050 g in 50 mL of solvent" for molecular weights less than 1,000,000 g/mole.

The polystyrene standards were dissolved at 80° C., with gentle agitation, for 30 minutes. The narrow standards mixtures were run first, and in order of decreasing "highest molecular weight component," to minimize degradation. The polystyrene standard peak molecular weights were converted to polyethylene molecular weight using Equation 1 (as described in Williams and Ward, *J. Polym. Sci.*, Polym. Letters, 6, 621 (1968)):

$$M_{polyethylene} = A \times (M_{polystyrene})^B \quad \text{(Eqn. 1)},$$

where M is the molecular weight, A is equal to 0.4316 and B is equal to 1.0.

Number-average molecular weight (Mn(conv gpc)), weight average molecular weight (Mw-conv gpc), and z-average molecular weight (Mz(conv gpc)) were calculated according to Equations 2-4 below.

$$Mn(conv\ gpc) = \frac{\sum_{i=RV_{integration\ start}}^{i=RV_{integration\ end}} (IR_{measurement\ channel_i})}{\sum_{i=RV_{integration\ start}}^{i=RV_{integration\ end}} (IR_{measurement\ channel_i} / M_{PE_i})} \quad \text{(Eqn. 2)}$$

$$Mw(conv\ gpc) = \frac{\sum_{i=RV_{integration\ start}}^{i=RV_{integration\ end}} (M_{PE_i}\ IR_{measurement\ channel_i})}{\sum_{i=RV_{integration\ start}}^{i=RV_{integration\ end}} (IR_{measurement\ channel_i})} \quad \text{(Eqn. 3)}$$

$$Mz(conv\ gpc) = \frac{\sum_{i=RV_{integration\ start}}^{i=RV_{integration\ end}} (M_{PE_i}^2\ IR_{measurement\ channel_i})}{\sum_{i=RV_{integration\ start}}^{i=RV_{integration\ end}} (M_{PE_i}\ IR_{measurement\ channel_i})} \quad \text{(Eqn. 4)}$$

In Equations 2-4, the RV is column retention volume (linearly-spaced), collected at "1 point per second," the IR is the baseline-subtracted IR detector signal, in Volts, from the IR5 measurement channel of the GPC instrument, and $M_{PE}$ is the polyethylene-equivalent MW determined from Equation 1. Data calculation were performed using "GPC One software (version 2.013H)" from PolymerChar.

Creep Zero Shear Viscosity Measurement Method

Zero-shear viscosities were obtained via creep tests, which were conducted on an AR-G2 stress controlled rheometer (TA Instruments; New Castle, Del.), using "25-mm-diameter" parallel plates, at 190° C. The rheometer oven was set to test temperature for at least 30 minutes, prior to zeroing the fixtures. At the testing temperature, a compression molded sample disk was inserted between the plates, and allowed to come to equilibrium for five minutes. The upper plate was then lowered down to 50 μm (instrument setting) above the desired testing gap (1.5 mm). Any superfluous material was trimmed off, and the upper plate was lowered to the desired gap. Measurements were done under nitrogen purging, at a flow rate of 5 L/min. The default creep time was set for two hours. Each sample was compression-molded into a "2 mm thick×25 mm diameter" circular plaque, at 177° C., for five minutes, under 10 MPa pressure, in air. The sample was then taken out of the press and placed on a counter top to cool.

A constant low shear stress of 20 Pa was applied for all of the samples, to ensure that the steady state shear rate was low enough to be in the Newtonian region. The resulting steady state shear rates were in the range from $10^{-3}$ to $10^{-4}$ s$^{-1}$ for the samples in this study. Steady state was determined by taking a linear regression for all the data, in the last 10% time window of the plot of "log (J(t)) vs. log(t)," where J(t) was creep compliance and t was creep time. If the slope of the linear regression was greater than 0.97, steady state was considered to be reached, then the creep test was stopped. In all cases in this study, the slope meets the criterion within one hour. The steady state shear rate was determined from the slope of the linear regression of all of the data points, in the last 10% time window of the plot of "ε vs. t," where ε was strain. The zero-shear viscosity was determined from the ratio of the applied stress to the steady state shear rate.

In order to determine if the sample was degraded during the creep test, a small amplitude oscillatory shear test was conducted before, and after, the creep test, on the same specimen from 0.1 to 100 rad/s. The complex viscosity values of the two tests were compared. If the difference of the viscosity values, at 0.1 rad/s, was greater than 5%, the sample was considered to have degraded during the creep test, and the result was discarded.

Zero-Shear Viscosity Ratio (ZSVR) is defined as the ratio of the zero-shear viscosity (ZSV) of the branched polyethylene material to the ZSV of a linear polyethylene material (see ANTEC proceeding below) at the equivalent weight average molecular weight (Mw(conv gpc)), according to the following Equation 5:

$$ZSVR = \frac{\eta_{0B}}{\eta_{0L}} = \frac{\eta_{0B}}{2.29^{-15} M_{w(conv \cdot gpc)}^{3.65}}. \quad \text{(Eqn. 5)}$$

The ZSV value was obtained from creep test, at 190° C., via the method described above. The Mw(conv gpc) value was determined by the conventional GPC method (Equation 3), as discussed above. The correlation between ZSV of linear polyethylene and its Mw(conv gpc) was established based on a series of linear polyethylene reference materials. A description for the ZSV-Mw relationship can be found in the ANTEC proceeding: Karjala et al., *Detection of Low Levels of Long-chain Branching in Polyolefins*, Annual Technical Conference-Society of Plastics Engineers (2008), 66th 887-891.

$^1$H NMR Method

A stock solution (3.26 g) was added to "0.133 g of the polymer sample" in 10 mm NMR tube. The stock solution was a mixture of tetrachloroethane-d$_2$ (TCE) and perchloroethylene (50:50, w:w) with 0.001M Cr$^{3+}$. The solution in the tube was purged with N$_2$, for 5 minutes, to reduce the amount of oxygen. The capped sample tube was left at room temperature, overnight, to swell the polymer sample. The sample was dissolved at 110° C. with periodic vortex mixing. The samples were free of the additives that may contribute to unsaturation, for example, slip agents such as erucamide. Each $^1$H NMR analysis was run with a 10 mm cryoprobe, at 120° C., on Bruker AVANCE 400 MHz spectrometer.

Two experiments were run to get the unsaturation: the control and the double presaturation experiments. For the control experiment, the data was processed with an exponential window function with LB=1 Hz, and the baseline was corrected from 7 to −2 ppm. The signal from residual $^1$H of TCE was set to 100, and the integral $I_{total}$ from −0.5 to 3 ppm was used as the signal from whole polymer in the control experiment. The "number of CH$_2$ group, NCH$_2$," in the polymer was calculated as follows in Equation 1A:

$$NCH_2 = I_{total}/2 \quad \text{(Eqn. 1A)}.$$

For the double presaturation experiment, the data was processed with an exponential window function with LB=1 Hz, and the baseline was corrected from about 6.6 to 4.5 ppm. The signal from residual 1H of TCE was set to 100, and the corresponding integrals for unsaturations ($I_{vinylene}$, $I_{trisubstituted}$, $I_{vinyl}$ and $I_{vinylidene}$) were integrated. It is well known to use NMR spectroscopic methods for determining polyethylene unsaturation, for example, see Busico, V., et al., *Macromolecules*, 2005, 38, 6988. The number of unsaturation unit for vinylene, trisubstituted, vinyl and vinylidene were calculated as follows:

$$N_{vinylene} = I_{vinylene}/2 \quad \text{(Eqn. 2A)},$$

$$N_{trisubstituted} = I_{trisubstitute} \quad \text{(Eqn. 3A)},$$

$$N_{vinyl} = I_{vinyl}/2 \quad \text{(Eqn. 4A)},$$

$$N_{vinylidene} = I_{vinylidene}/2 \quad \text{(Eqn. 5A)}.$$

The unsaturation units per 1,000 carbons, all polymer carbons including backbone carbons and branch carbons, were calculated as follows:

$$N_{vinylene}/1,000C = (N_{vinylene}/NCH_2)*1,000 \quad \text{(Eqn. 6A)},$$

$$N_{trisubstituted}/1,000C = (N_{trisubstituted}/NCH_2)*1,000 \quad \text{(Eqn. 7A)},$$

$$N_{vinyl}/1,000C = (N_{vinyl}/NCH_2)*1,000 \quad \text{(Eqn. 8A)},$$

$$N_{vinylidene}/1,000C = (N_{vinylidene}/NCH_2)*1,000 \quad \text{(Eqn. 9A)},$$

The chemical shift reference was set at 6.0 ppm for the 1H signal from residual proton from TCE-d2. The control was run with ZG pulse, NS=4, DS=12, SWH=10,000 Hz, AQ=1.64 s, D1=14 s. The double presaturation experiment was run with a modified pulse sequence, with O1P=1.354 ppm, O2P=0.960 ppm, PL9=57 db, PL21=70 db, NS=100, DS=4, SWH=10,000 Hz, AQ=1.64 s, D1=1 s (where D1 is the presaturation time), D13=13 s. Only the vinyl levels were reported in Table 2 below.

$^{13}$C NMR Method

Samples are prepared by adding approximately 3 g of a 50/50 mixture of tetra-chloroethane-d2/orthodichlorobenzene, containing 0.025 M Cr(AcAc)$_3$, to a "0.25 g polymer sample" in a 10 mm NMR tube. Oxygen is removed from the sample by purging the tube headspace with nitrogen. The samples are then dissolved, and homogenized, by heating the tube and its contents to 150° C., using a heating block and heat gun. Each dissolved sample is visually inspected to ensure homogeneity.

All data are collected using a Bruker 400 MHz spectrometer. The data is acquired using a 6 second pulse repetition delay, 90-degree flip angles, and inverse gated decoupling with a sample temperature of 120° C. All measurements are made on non-spinning samples in locked mode. Samples are allowed to thermally equilibrate for 7 minutes prior to data acquisition. The 13C NMR chemical shifts were internally referenced to the EEE triad at 30.0 ppm.

C13 NMR Comonomer Content: It is well known to use NMR spectroscopic methods for determining polymer composition. ASTM D 5017-96; J. C. Randall et al., in "NMR and Macromolecules" ACS Symposium series 247; J. C. Randall, Ed., Am. Chem. Soc., Washington, D.C., 1984, Ch. 9; and J. C. Randall in "Polymer Sequence Determination", Academic Press, New York (1977) provide general methods of polymer analysis by NMR spectroscopy.

Molecular Weighted Comonomer Distribution Index (MWCDI)

A GPC-IR, high temperature chromatographic system from PolymerChar (Valencia, Spain) was equipped with a Precision Detectors' (Amherst, Mass.) 2-angle laser light scattering detector Model 2040, and an IR5 infra-red detector (GPC-IR) and a 4-capillary viscometer, both from PolymerChar. The "15-degree angle" of the light scattering detector was used for calculation purposes. Data collection was performed using PolymerChar Instrument Control software and data collection interface. The system was equipped with an on-line, solvent degas device and pumping system from Agilent Technologies (Santa Clara, Calif.).

Injection temperature was controlled at 150 degrees Celsius. The columns used, were four, 20-micron "Mixed-A" light scattering columns from Polymer Laboratories (Shropshire, UK). The solvent was 1,2,4-trichlorobenzene. The samples were prepared at a concentration of "0.1 grams of polymer in 50 milliliters of solvent." The chromatographic solvent and the sample preparation solvent each contained "200 ppm of butylated hydroxytoluene (BHT)." Both solvent sources were nitrogen sparged. Ethylene-based polymer samples were stirred gently, at 160 degrees Celsius, for three hours. The injection volume was "200 microliters," and the flow rate was "1 milliliters/minute."

Calibration of the GPC column set was performed with 21 "narrow molecular weight distribution" polystyrene standards, with molecular weights ranging from 580 to 8,400,000 g/mole. These standards were arranged in six "cocktail" mixtures, with at least a decade of separation between individual molecular weights. The standards were purchased from Polymer Laboratories (Shropshire UK). The polystyrene standards were prepared at "0.025 grams in 50 milliliters of solvent" for molecular weights equal to, or greater than, 1,000,000 g/mole, and at "0.050 grams in 50 milliliters of solvent" for molecular weights less than 1,000,000 g/mole. The polystyrene standards were dissolved at 80 degrees Celsius, with gentle agitation, for 30 minutes. The narrow standards mixtures were run first, and in order of decreasing "highest molecular weight component," to minimize degradation. The polystyrene standard peak molecular weights were converted to polyethylene molecular weights using Equation 1B (as described in Williams and Ward, J. Polym. Sci., Polym. Let., 6, 621 (1968)):

$$M_{polyethylene} = A \times (M_{polystyrene})^B \quad \text{(Eqn. 1B)},$$

where M is the molecular weight, A has a value of approximately 0.40 and B is equal to 1.0. The A value was adjusted between 0.385 and 0.425 (depending upon specific column-set efficiency), such that NBS 1475A (NIST) linear polyethylene weight-average molecular weight corresponded to 52,000 g/mole, as calculated by Equation 3B, below:

$$Mn(LALS\ gpc) = \frac{\sum_{i=RV_{integration\ start}}^{i=RV_{integration\ end}} (IR_{measurement\ channel_i})}{\sum_{i=RV_{integration\ start}}^{i=RV_{integration\ end}} (IR_{measurement\ channel_i} / M_{PE_i})} \quad \text{(Eqn. 2B)}$$

$$Mw(LALS\ gpc) = \frac{\sum_{i=RV_{integration\ start}}^{i=RV_{integration\ end}} (M_{PE_i}\ IR_{measurement\ channel_i})}{\sum_{i=RV_{integration\ start}}^{i=RV_{integration\ end}} (IR_{measurement\ channel_i})} \quad \text{(Eqn. 3B)}$$

In Equations 2B and 3B, RV is column retention volume (linearly-spaced), collected at "1 point per second." The IR is the baseline-subtracted IR detector signal, in Volts, from the measurement channel of the GPC instrument, and the $M_{PE}$ is the polyethylene-equivalent MW determined from Equation 1B. Data calculation were performed using "GPC One software (version 2.013H)" from PolymerChar.

A calibration for the IR5 detector ratios was performed using at least ten ethylene-based polymer standards (polyethylene homopolymer and ethylene/octene copolymers; narrow molecular weight distribution and homogeneous comonomer distribution) of known short chain branching (SCB) frequency (measured by the $^{13}$C NMR Method, as discussed above), ranging from homopolymer (0 SCB/1000 total C) to approximately 50 SCB/1000 total C, where total C=carbons in backbone+carbons in branches. Each standard had a weight-average molecular weight from 36,000 g/mole to 126,000 g/mole, as determined by the GPC-LALS processing method described above. Each standard had a molecular weight distribution (Mw/Mn) from 2.0 to 2.5, as determined by the GPC-LALS processing method described above. Polymer properties for the SCB standards are shown in Table 1.

TABLE 1

"SCB" Standards

| Wt % Comonomer | IR5 Area ratio | SCB/1000 Total C | Mw | Mw/Mn |
|---|---|---|---|---|
| 23.1 | 0.2411 | 28.9 | 37,300 | 2.22 |
| 14.0 | 0.2152 | 17.5 | 36,000 | 2.19 |
| 0.0 | 0.1809 | 0.0 | 38,400 | 2.20 |
| 35.9 | 0.2708 | 44.9 | 42,200 | 2.18 |
| 5.4 | 0.1959 | 6.8 | 37,400 | 2.16 |
| 8.6 | 0.2043 | 10.8 | 36,800 | 2.20 |
| 39.2 | 0.2770 | 49.0 | 125,600 | 2.22 |
| 1.1 | 0.1810 | 1.4 | 107,000 | 2.09 |
| 14.3 | 0.2161 | 17.9 | 103,600 | 2.20 |
| 9.4 | 0.2031 | 11.8 | 103,200 | 2.26 |

The "IR5 Area Ratio (or "IR5$_{Methyl\ Channel\ Area}$/IR5$_{Measurement\ Channel\ Area}$")" of "the baseline-subtracted area response of the IR5 methyl channel sensor" to "the baseline-subtracted area response of IR5 measurement channel sensor" (standard filters and filter wheel as supplied by PolymerChar: Part Number IR5_FWM01 included as part of the GPC-IR instrument) was calculated for each of the "SCB" standards. A linear fit of the SCB frequency versus the "IR5 Area Ratio" was constructed in the form of the following Equation 4B:

SCB/1000 total C=$A_0$+[$A_1$× (IR5$_{Methyl\ Channel\ Area}$/IR5$_{Measurement\ Channel\ Area}$)](Eqn. 4B), where $A_0$ is the "SCB/1000 total C" intercept at an "IR5 Area Ratio" of zero, and A is the slope of the "SCB/1000 total C" versus "IR5 Area Ratio," and represents the increase in the "SCB/1000 total C" as a function of "IR5 Area Ratio."

A series of "linear baseline-subtracted chromatographic heights" for the chromatogram generated by the "IR5 methyl channel sensor" was established as a function of column elution volume, to generate a baseline-corrected chromatogram (methyl channel). A series of "linear baseline-subtracted chromatographic heights" for the chromatogram generated by the "IR5 measurement channel" was established as a function of column elution volume, to generate a base-line-corrected chromatogram (measurement channel).

The "IR5 Height Ratio" of "the baseline-corrected chromatogram (methyl channel)" to "the baseline-corrected chromatogram (measurement channel)" was calculated at each column elution volume index (each equally-spaced index, representing 1 data point per second at 1 ml/min elution) across the sample integration bounds. The "IR5 Height Ratio" was multiplied by the coefficient $A_1$, and the coefficient $A_0$ was added to this result, to produce the predicted SCB frequency of the sample. The result was converted into mole percent comonomer, as follows in Equation 5B:

Mole Percent Comonomer=$\{SCB_f/[SCB_f+((1000-SCB_f*Length\ of\ comonomer)/2)]\}*100$ (Eqn. 5B), where "$SCB_f$" is the "SCB per 1000 total C" and the "Length of comonomer"=8 for octene, 6 for hexene, and so forth.

Each elution volume index was converted to a molecular weight value ($Mw_i$) using the method of Williams and Ward (described above; Eqn. 1B). The "Mole Percent Comonomer (y axis)" was plotted as a function of Log($Mw_i$), and the slope was calculated between $Mw_i$ of 15,000 and $Mw_i$ of 150,000 g/mole (end group corrections on chain ends were omitted for this calculation). An EXCEL linear regression was used to calculate the slope between, and including, $Mw_i$ from 15,000 to 150,000 g/mole. This slope is defined as the molecular weighted comonomer distribution index (MWCDI=Molecular Weighted Comonomer Distribution Index).

Representative Determination of MWCDI

A plot of the measured "SCB per 1000 total C(=$SCB_f$)" versus the observed "IR5 Area Ratio" of the SCB standards was generated (see FIG. 1), and the intercept ($A_0$) and slope ($A_1$) were determined. Here, $A_0$=−90.246 SCB/1000 total C; and $A_1$=499.32 SCB/1000 total C.

Figure 2:
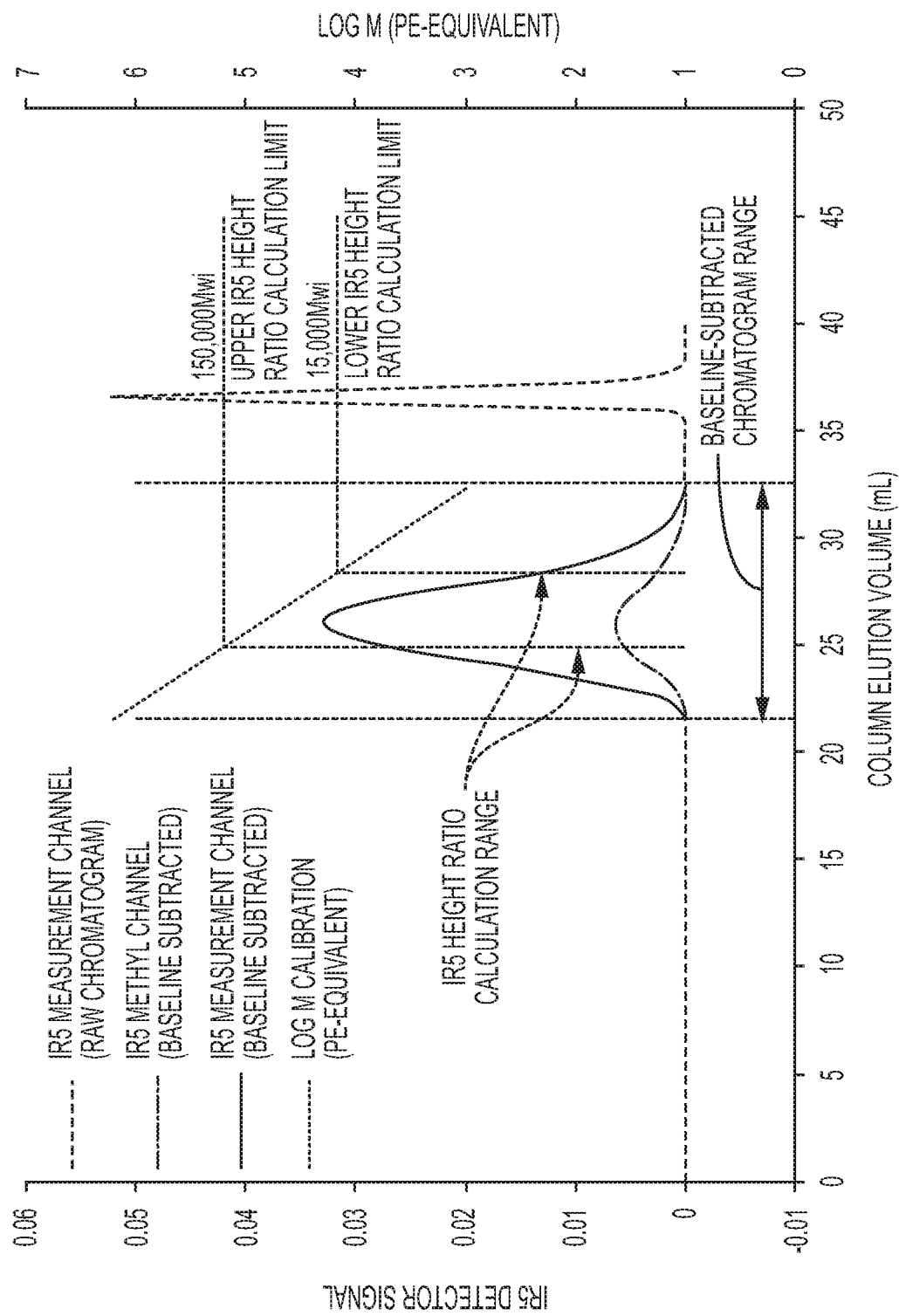
FIG. 2 depicts the several GPC profiles for the determination of IR5 Height Ratio for a sample first composition.
Figure 3:
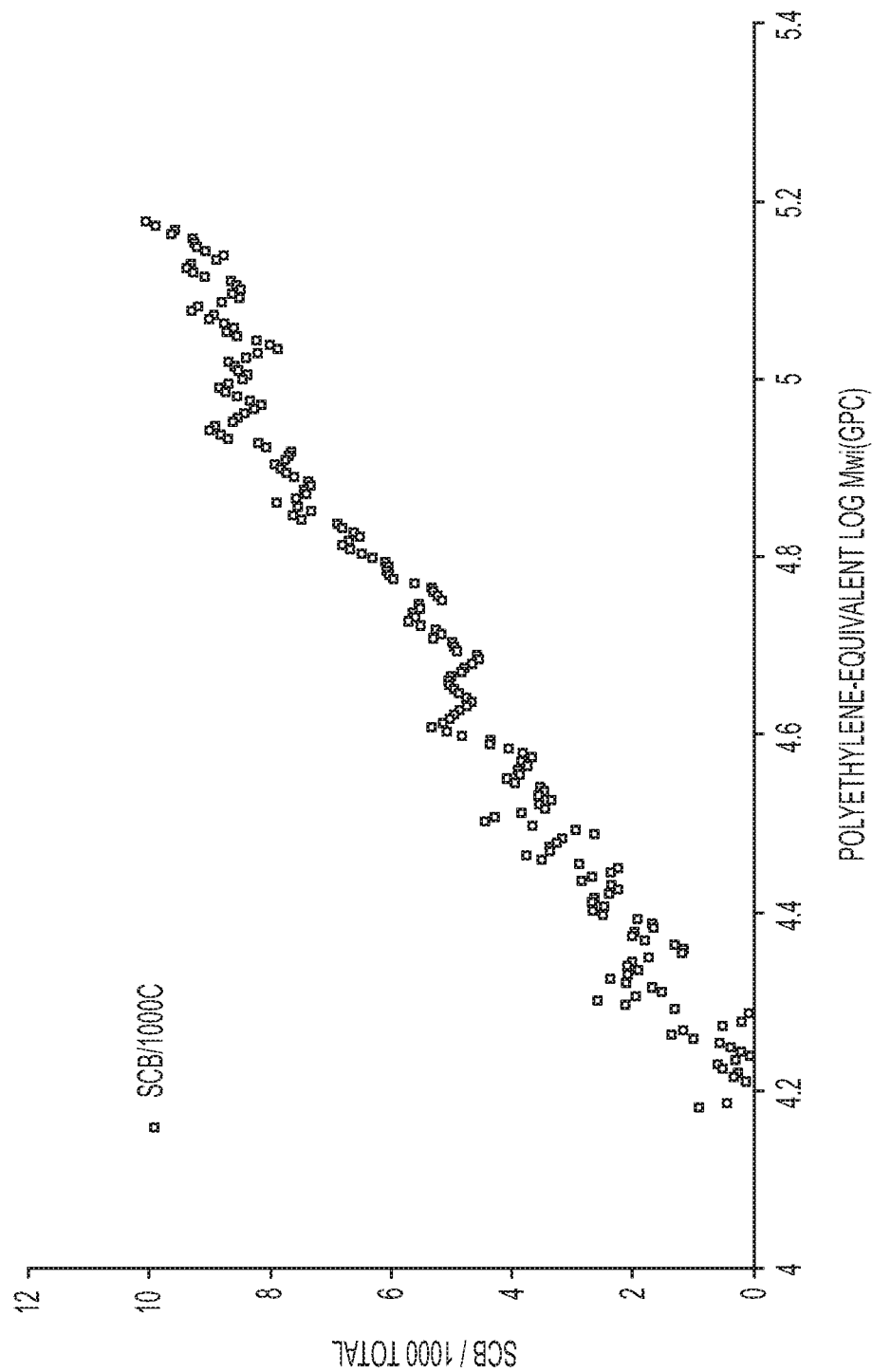
FIG. 3 depicts the plot of "$SCB_f$ versus Polyethylene Equivalent molecular Log $Mw_i$ (GPC)" for a sample first composition.
Figure 4:
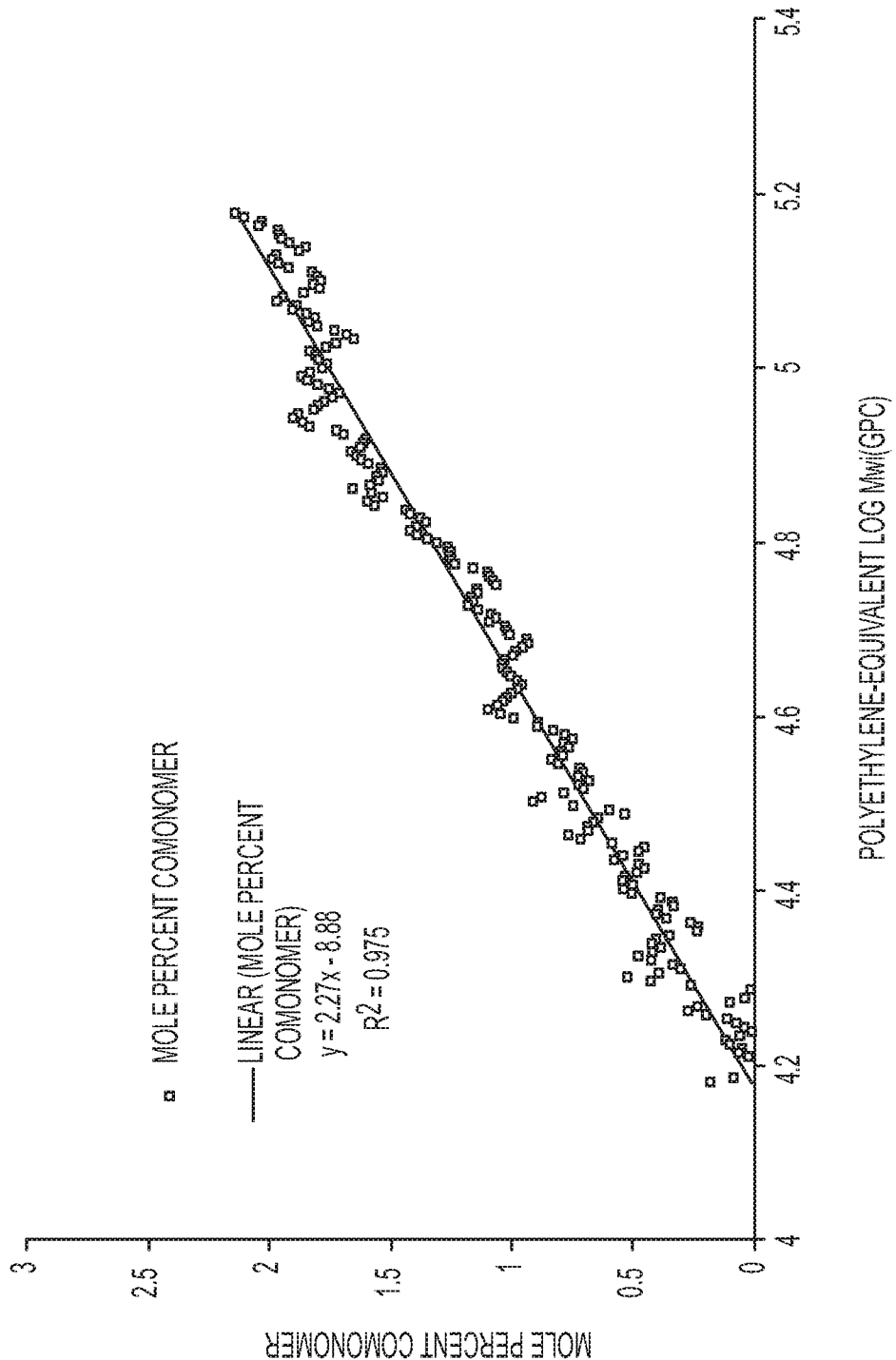
FIG. 4 depicts a plot of the "Mole Percent Comonomer versus Polyethylene Equivalent $Log_{Mwi}$ (GPC)" for a sample first composition.

The "IR5 Height Ratio" was determined for a sample composition (see integration shown in FIG. 2). This height ratio (IR5 Height Ratio) was multiplied by the coefficient $A_1$, and the coefficient $A_0$ was added to this result, to produce the predicted SCB frequency of this example, at each elution volume index, as described above ($A_0$=−90.246 SCB/1000 total C; and $A_1$=499.32 SCB/1000 total C). The $SCB_f$ was plotted as a function of polyethylene-equivalent molecular weight, as determined using Equation 1B, as discussed above. See FIG. 4 (Log $Mw_i$ used as the x-axis).

The $SCB_f$ was converted into "Mole Percent Comonomer" via Equation 5B. The "Mole Percent Comonomer" was plotted as a function of polyethylene-equivalent molecular weight, as determined using Equation 1B, as discussed above. See FIG. 5 (Log Mwi used for the x-axis). A linear fit was from Mwi of 15,000 g/mole to Mwi of 150,000 g/mole, yielding a slope of "2.27 mole percent comonomer× mole/g." Thus, the MWCDI=2.27. An EXCEL linear regression was used to calculate the slope between, and including, Mwi from 15,000 to 150,000 g/mole.

Puncture Resistance

Puncture resistance is measured on a dynamometer according to ASTM D5748 in the standard laboratory atmosphere as temperature of 23±2° C.

Instrumented Dart Impact

Instrumented Dart Impact, which is measured according to ASTM D3763, is the total energy required to puncture a material by impact with a falling dart under specified test conditions. Here, a 12.7 mm (0.5 in) diameter hemispherical head dart was dropped from a height of 66 cm.

TABLE 2

| Bending Angle | 40° |
|---|---|
| Bending time | 5 s |
| Bending Length | 1 mm |
| Angular velocity | 6°/sec |
| Specimen | 80 × 15 mm |

EXAMPLES

The following examples illustrate features of the present disclosure but are not intended to limit the scope of the disclosure.

Commercial Polymers Used

The following compositions listed in Table 3 were included in the thermoformed monolayer and multilayer examples discussed below.

TABLE 3

| Material | Melt Index ($I_2$) g/10 min | Density (g/cc) | Supplier |
|---|---|---|---|
| Inventive First Composition 1 | 0.85 | 0.918 | n/a |
| DOWLEX ™ NG 2045B (LLDPE) | 1.00 | 0.920 | The Dow Chemical Company, Midland, MI |
| ELITE ™ NG 5400B (LLDPE) | 1.00 | 0.916 | The Dow Chemical Company, Midland, MI |
| Inventive First Composition 2 | 0.85 | 0.926 | n/a |
| DOWLEX ™ NG 2049B (LLDPE) | 1.00 | 0.926 | The Dow Chemical Company, Midland, MI |
| DOW ™ LDPE 132I | 0.25 | 0.921 | The Dow Chemical Company, Midland, MI |

TABLE 3-continued

| Material | Melt Index (I$_2$) g/10 min | Density (g/cc) | Supplier |
|---|---|---|---|
| VERSIFY ™ 2000 (Propylene-ethylene copolymer) | 2.00 | 0.888 | The Dow Chemical Company, Midland, MI |
| ATTANE ™ 4203 (ULDPE) | 0.80 | 0.905 | The Dow Chemical Company, Midland, MI |
| ELITE ™ AT 6101 (LLDPE) | 0.80 | 0.905 | The Dow Chemical Company, Midland, MI |
| ELITE ™ 5230 | 4 | 0.916 | The Dow Chemical Company, Midland, MI |
| ATTANE ™ 4404 (ULDPE) | 4 | 0.904 | The Dow Chemical Company, Midland, MI |
| DOWLEX ™ 2027 (LLDPE) | 4 | 0.94 | The Dow Chemical Company, Midland, MI |
| DOW ™ LDPE 5004i | 4.15 | 0.924 | The Dow Chemical Company, Midland, MI |
| Inventive First Composition 3 | 0.85 | 0.915 | n/a |
| DOWLEX ™ 2247 (LLDPE) | 2.3 | 0.917 | The Dow Chemical Company, Midland, MI |
| ELITE ™ AT 6111 (LLDPE) | 0.85 | 0.912 | The Dow Chemical Company, Midland, MI |
| Tie Resin 1 (Maleic Anhydride Grafted Polyolefin)* | 6.9 | 0.911 | n/a |
| AMPLIFY ™ TY 1352 | 1.0 | 0.922 | The Dow Chemical Company, Midland, MI |
| Ultramid C40 L Nylon | n/a | n/a | BASF |
| Soarnol ET 3803R (EVOH) | n/a | 1.16 | The Nippon Synthetic Chemical Industry Co., Ltd. |
| ELITE ™ 5401 | 1.0 | 0.918 | The Dow Chemical Company, Midland, MI |

*Tie Resin 1 corresponds to the Inventive Tie Layer 1, which has a composition and method of making described in Table 5 of PCT Publication No. WO2017/053221, which is incorporated by reference herein in its entirety.

Inventive First Compositions 1-3

Inventive First Compositions 1-3 each contain two ethylene-octene copolymers. Each composition was prepared, via solution polymerization, in a dual series loop reactor system according to U.S. Pat. No. 5,977,251 (see FIG. 2 of this patent), in the presence of a first catalyst system, as described below, in the first reactor, and a second catalyst system, as described below, in the second reactor.

The first catalyst system comprised a bis((2-oxoyl-3-(dibenzo-1H-pyrrole-1-yl)-5-(methyl)phenyl)-2-phenoxymethyl)-methylene-1,2-cyclohexanediylhafnium (IV) dimethyl, represented by the following formula (CAT 1):

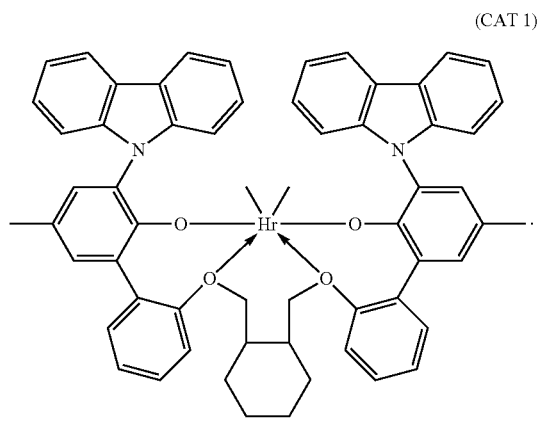

(CAT 1)

The molar ratios of the metal of CAT 1, added to the polymerization reactor, in-situ, to that of Cocat1 (modified methyl aluminoxane), or Cocat2 (bis(hydrogenated tallow alkyl)methyl, tetrakis(pentafluorophenyl)borate(1-) amine), are shown in Table 4 below.

The second catalyst system comprised a Ziegler-Natta type catalyst (CAT 2). The heterogeneous Ziegler-Natta type catalyst-premix was prepared substantially according to U.S. Pat. No. 4,612,300, by sequentially adding to a volume of ISOPAR E, a slurry of anhydrous magnesium chloride in ISOPAR E, a solution of $EtAlCl_2$ in heptane, and a solution of $Ti(O-iPr)_4$ in heptane, to yield a composition containing a magnesium concentration of 0.20M, and a ratio of Mg/Al/Ti of 40/12.5/3. An aliquot of this composition was further diluted with ISOPAR-E to yield a final concentration of 500 ppm Ti in the slurry. While being fed to, and prior to entry into, the polymerization reactor, the catalyst premix was contacted with a dilute solution of $Et_3Al$, in the molar Al to Ti ratio specified in Table 4, to give the active catalyst.

The polymerization conditions for the Inventive First Compositions 1-3 are reported in Table 4. As seen in Table 4, Cocat. 1 (modified methyl aluminoxane (MMAO)); and Cocat. 2 (bis(hydrogenated tallow alkyl)methyl, tetrakis (pentafluorophenyl)borate(1-) amine) were each used as a cocatalyst for CAT 1. Additional properties of the Inventive First Compositions 1-3 were measured, and are reported in Table 5. Each polymer composition was stabilized with minor (ppm) amounts of stabilizers.

TABLE 4

| Polymerization Conditions (Rx1 = reactor 1; Rx2 = reactor 2) | | | | |
|---|---|---|---|---|
| Sample # | Units | Inv. First Comp. 1 | Inv. First Comp. 2 | Inv. First Comp. 3 |
| Reactor Configuration | | Dual Series | Dual Series | Dual Series |
| Comonomer | | 1-octene | 1-octene | 1-octene |
| REACTOR FEEDS | | | | |
| First Reactor Total Solvent Flow | lb/hr | 1122 | 1067 | 1240 |
| First Reactor Total Ethylene Flow | lb/hr | 190 | 176 | 198 |
| First Reactor Total Comonomer Flow | lb/hr | 74 | 43 | 79 |
| First Reactor Hydrogen Feed Flow | SCCM | 6827 | 4607 | 4899 |
| Second Reactor Total Solvent Flow | lb/hr | 384 | 447 | 382 |
| Second Reactor Total Ethylene Flow | lb/hr | 173 | 202 | 159 |
| Second Reactor Total Comonomer Flow | lb/hr | 12 | 6 | 10 |
| Second Reactor Hydrogen Feed Flow | SCCM | 298 | 1357 | 2701 |
| REACTION | | | | |
| First Reactor Control Temperature | °C. | 140 | 150 | 145 |
| First Reactor Ethylene Conversion | % | 86.7 | 90.9 | 87.8 |
| First Reactor Viscosity | cP | 2400 | 1658 | 1469 |
| Second Reactor Control Temperature | °C. | 195 | 195 | 195 |
| Second Reactor Ethylene Conversion | % | 87.1 | 84.6 | 83.0 |
| Second Reactor Viscosity | cP | 869 | 814 | 521 |
| CATALYST | | | | |
| First Reactor Catalyst | Type | CAT 1 | CAT 1 | CAT 1 |
| First Reactor Catalyst | g polymer per | 3,681,068 | 653238 | 668470 |

TABLE 4-continued

| Polymerization Conditions (Rx1 = reactor 1; Rx2 = reactor 2) | | | | |
|---|---|---|---|---|
| Sample # | Units | Inv. First Comp. 1 | Inv. First Comp. 2 | Inv. First Comp. 3 |
| Efficiency | g catalyst metal | | | |
| First Reactor Cocatalyst (Cocat. 2) to Catalyst Metal Molar Ratio | Ratio | 1.3 | 1.2 | 1.1 |
| First Reactor Cocatalyst (Cocat. 1) to Catalyst Metal Molar Ratio | Ratio | 20 | 50.0 | 50.0 |
| Second Reactor Catalyst Efficiency | g polymer per g catalyst metal | 404,385 | 431113 | 381486 |
| Second Reactor Al to Ti Molar Ratio | Ratio | 4.0 | 4.0 | 4.0 |

*solvent = ISOPAR E

TABLE 5

| Properties of Inventive First Compositions 1-3 | | | | |
|---|---|---|---|---|
| | Unit | Inv. First Comp. 1 | Inv. First Comp. 2 | Inv. First Comp. 3 |
| Density | g/cc | 0.918 | 0.926 | 0.915 |
| $I_2$ | g/10 min | 0.85 | 0.85 | 0.85 |
| $I_{10}/I_2$ | | 7.7 | 7.5 | 8.1 |
| 7.0-1.2xlog(I2) | | 7.1 | 7.1 | 7.1 |
| Mn (conv. gpc) | g/mol | 32,973 | 32,467 | 28,130 |
| Mw (conv. gpc) | | 117,553 | 112,291 | 114,384 |
| Mz (conv. gpc) | | 270,191 | 262,093 | 274,682 |
| Mw/Mn (conv. gpc) | | 3.57 | 3.46 | 4.07 |
| Mz/Mw (conv. gpc) | | 2.30 | 2.33 | 2.40 |
| Eta* (0.1 rad/s) | Pa · s | 9,496 | 9,550 | 10,388 |
| Eta* (1.0 rad/s) | Pa · s | 7,693 | 7,377 | 8,031 |
| Eta* (10 rad/s) | Pa · s | 4,706 | 4,470 | 4,634 |
| Eta* (100 rad/s) | Pa · s | 1,778 | 1,774 | 1,669 |
| Eta*0.1/Eta*100 | | 5.34 | 5.38 | 6.22 |
| Eta zero | Pa · s | 11,210 | 11,764 | 12,828 |
| MWCDI | | 2.64 | 1.86 | 3.17 |
| Vinyls | Per 1000 total Carbons | 134 | 1.89 | NM |
| ZSVR | | 1.53 | | 1.93 |

Example 1: Monolayer Films

Referring to Table 6 below, several monolayer films were produced on a 5 Layer Collin Coextrusion Blown Film Line in accordance with the following parameters provided on Table 7.

TABLE 6

| Monolayer Films |
|---|
| Inventive First Composition 1 |
| DOWLEX ™ NG 2045B (LLDPE) |
| ELITE ™ NG 5400B (LLDPE) |
| Inventive First Composition 2 |
| DOWLEX ™ NG 2049B (LLDPE) |
| DOW ™ LDPE 132I |
| VERSIFY ™ 2000 (Propylene-ethylene copolymer) |
| ATTANE ™ 4203 (ULDPE) |

TABLE 7

| Monolayer Film | |
|---|---|
| Thickness | 100 μm |
| Blow Up Ratio (BUR) | 3.0 |
| Lay flat width | 377 mm |

TABLE 7-continued

| Monolayer Film | |
|---|---|
| Final width | 323 mm |
| Die Type | 80 mm |

The monolayer films were thermoformed using an R145 Multivac thermoforming machine using the following thermoforming parameters provided in Table 8.

TABLE 8

| Mold size | 1 Package |
|---|---|
| Package size | 242 mm × 242 mm. |
| Temperature | 95° C. |
| Maximum Depth of Tray | 110 mm. |
| Heating time | 2 sec. |
| Forming time | 2 sec |

Figure 5:
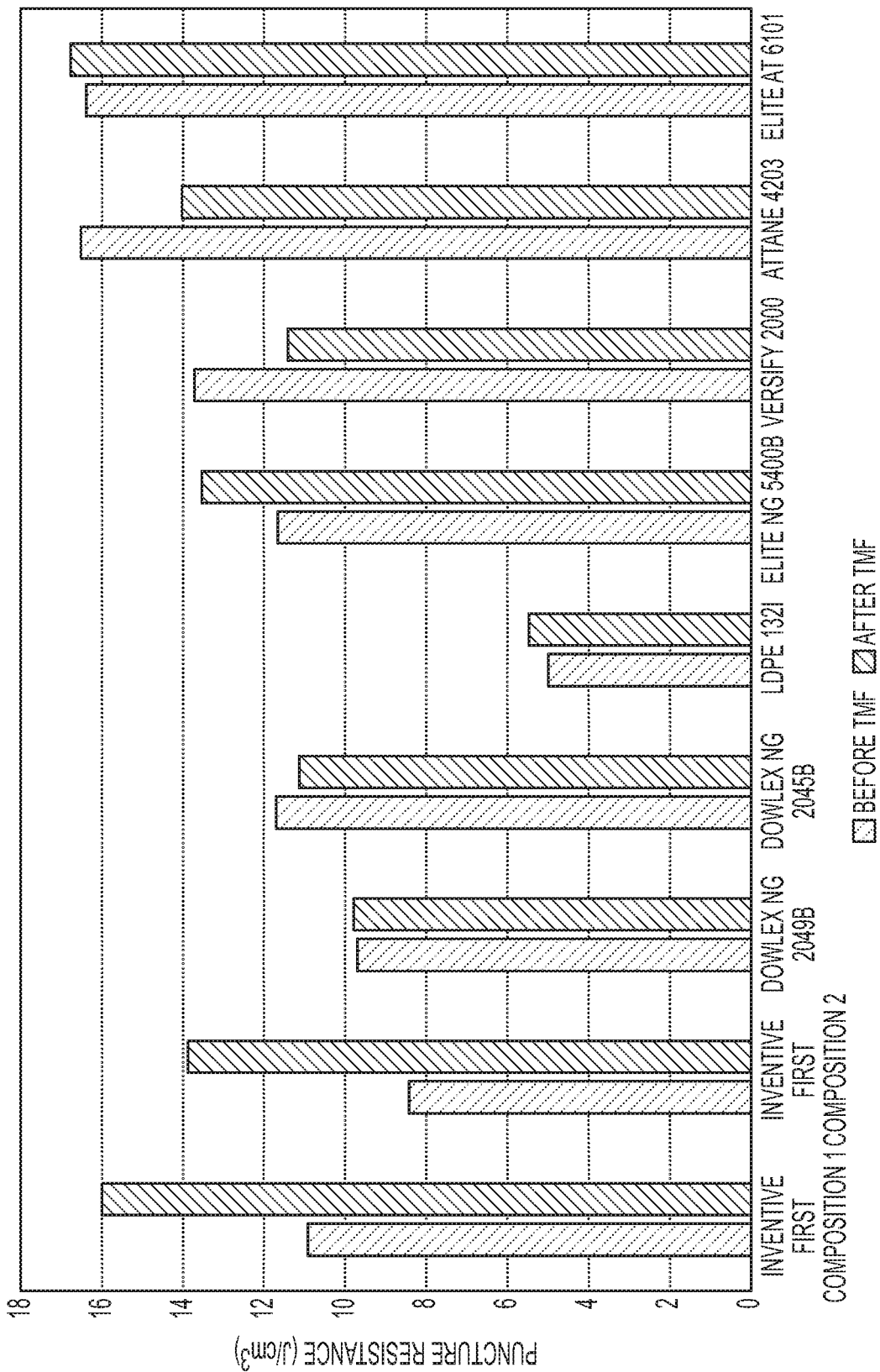
FIG. 5 is a bar graph depicting puncture resistance for several monolayer films before and after thermoforming in accordance with one or more embodiments of the present disclosure.

The puncture resistance for the monolayer films pre-thermoforming and post-thermoforming are provided in FIG. 5. As shown, the monolayer films comprising the Inventive First Compositions 1 and 2 showed marked improvement (e.g., at least 10%) in puncture resistance after undergoing thermoforming, whereas the comparative conventional monolayer films generally showed a decrease in puncture resistance or a very marginal increase.

Example 2: Thermoformed Multilayer Films (Cast Film Extrusion)

The following multilayer films of Table 9 had an ABCDE 5 layer structure produced through cast film extrusion. The thickness percentages of each layer is also provided in Table 9.

TABLE 9

Film Samples 1 and 2 and Comparative Film Samples C1-C3

| Sample # | Layer A Resin | Layer B Resin | Layer C Resin | Layer D Resin | Layer E Resin | % A | % B | % C | % D | % E |
|---|---|---|---|---|---|---|---|---|---|---|
| 1 | ELITE™ 5230 | ATTANE™ 4404 | Inventive First Composition 3 | ATTANE™ 4404 | ELITE™ 5230 | 20 | 20 | 25 | 20 | 15 |
| C1* | DOWLEX™ 2027 | DOWLEX™ 2247 | ELITE™ 5230 | DOWLEX™ 2247 | ELITE™ 5230 | 20 | 20 | 25 | 20 | 15 |
| C2* | DOWLEX™ 2247 | DOWLEX™ 2247 | ELITE™ 5230 | DOWLEX™ 2247 | ELITE™ 5230 | 20 | 20 | 25 | 20 | 15 |
| 2 | ELITE™ 5230 | Inventive First Composition 2 | ATTANE™ 4404 | Inventive First Composition 2 | ATTANE™ 4404 | 20 | 20 | 25 | 20 | 15 |
| C3* | VERSIFY™ 2000 | Tie Resin 1 | 50% DOWLEX™ 2247 + 50% LDPE 5004i | 50% DOWLEX™ 2247 + 50% LDPE 5004i | 50% DOWLEX™ 2247 + 50% LDPE 5004i | 20 | 20 | 25 | 20 | 15 |

*C1-C3 represents Comparative Film Samples 1-3

The multilayer films were produced on a Dow Freeport 5 Layer Cast Extrusion Film Line, with the following characteristics provided in Table 10.

TABLE 10

| Thickness | 7 mil (177.8 μm) |
|---|---|
| Final width | 24.25 in |
| 5 layer die cut | (20/20/20/20/20) |

The multilayer films of Table 9 were thermoformed into pouches using an R145 Multivac thermoforming machine with the following thermoforming parameters provided in Table 8 above.

Figure 6:
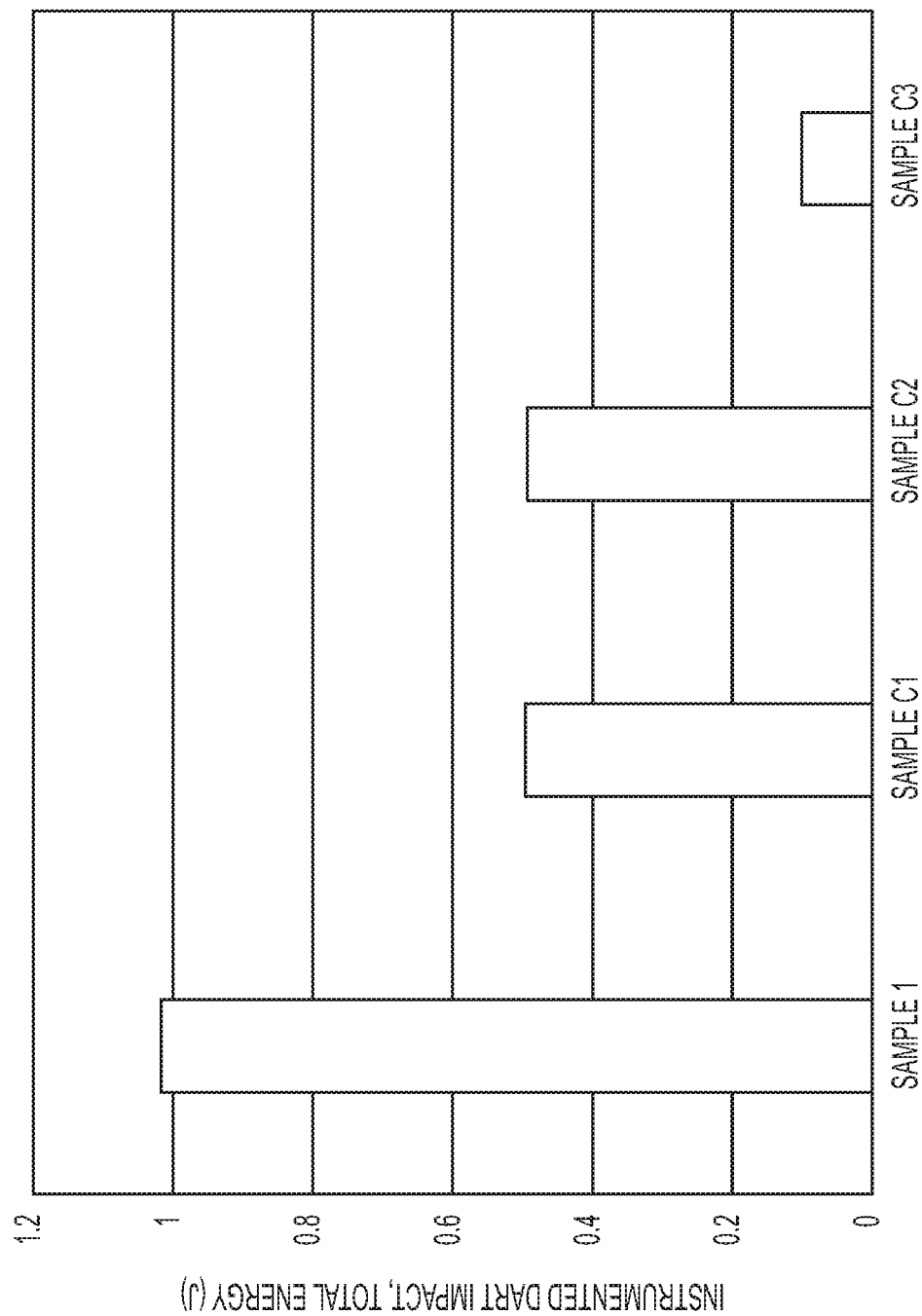
FIG. 6 is a bar graph depicting instrumented dart impact for several multilayer films before and after thermoforming in accordance with one or more embodiments of the present disclosure.

The dart performance, specifically, the Instrumented Dart Performance, for pouches after thermoforming are provided in FIG. 6. As shown, the Inventive Sample 1, which includes Inventive First Composition 3, has an Instrumented Dart Impact twice the value of Comparative Samples, C2 and C3, and have approximately 10 times the value of Comparative Sample C3.

Example 3: Thermoformed Multilayer Films (Blown Film Extrusion)

The following multilayer films of Table 11 had an ABCDE 5 layer structure produced through blown film extrusion. All films had a thickness of 100 μm.

TABLE 11

Film Samples 1 and 2 and Comparative Film Samples C1-C3

| Sample | Layer A Resin | Layer B Resin | Layer C Resin | Layer D Resin | Layer E Resin | % A | % B | % C | % D | % E |
|---|---|---|---|---|---|---|---|---|---|---|
| C4* | ELITE™ 5400B | AMPLIFY™ 1352 | Nylon (UBE) | AMPLIFY™ 1352 | DOWLEX™ 2049B | 30 | 10 | 20 | 1 | 30 |
| 3 | ELITE™ 5400B | ATTANE™ 4203 | Inventive First Composition 1 | ATTANE™ 4203 | Inventive First Composition 1 | 20 | 20 | 20 | 20 | 20 |
| 4 | ELITE™ 5400B | ATTANE™ 4203 | Inventive First Composition 1 | ATTANE™ 4203 | Inventive First Composition 1 | 20 | 10 | 30 | 10 | 30 |
| 5 | ELITE™ 5400B | ATTANE™ 4203 | Inventive First Composition 2 | ATTANE™ 4203 | Inventive First Composition 2 | 20 | 20 | 20 | 20 | 20 |
| 6 | ELITE™ 5400B | ATTANE™ 4203 | Inventive First Composition 2 | ATTANE™ 4203 | Inventive First Composition 2 | 20 | 10 | 30 | 10 | 30 |
| C5* | AMPLIFY™ 1352 | Nylon (UBE) | EVOH | Nylon (UBE) | AMPLIFY™ 1352 | 37 | 10 | 6 | 10 | 37 |
| 7 | Inventive First Composition 1 | AMPLIFY™ 1352 | EVOH | AMPLIFY™ 1352 | Inventive First Composition 1 | 37 | 10 | 6 | 10 | 37 |
| C6* | ELITE™ 5401B | AMPLIFY™ 1352 | EVOH | AMPLIFY™ 1352 | ELITE™ 5401B | 37 | 10 | 6 | 10 | 37 |

*C4-C6 represents Comparative Examples 4-6

The multilayer films of Table 11 were produced on a 5 Layer Collin Coextrusion Blown Film Line, with the following characteristics provided in Table 12.

TABLE 12

| | |
|---|---|
| Thickness | 100 μm |
| BUR | 3.0 |
| Lay flat width | 377 mm |
| Final width | 323 mm |
| Die Type | 80 mm |

The multilayer films of Table 11 were thermoformed using an R145 Multivac thermoforming machine into pouches using the thermoforming parameters provided in Table 8 above with the exception that the depth is 80 mm for the multilayer films of Table 11.

Figure 7:
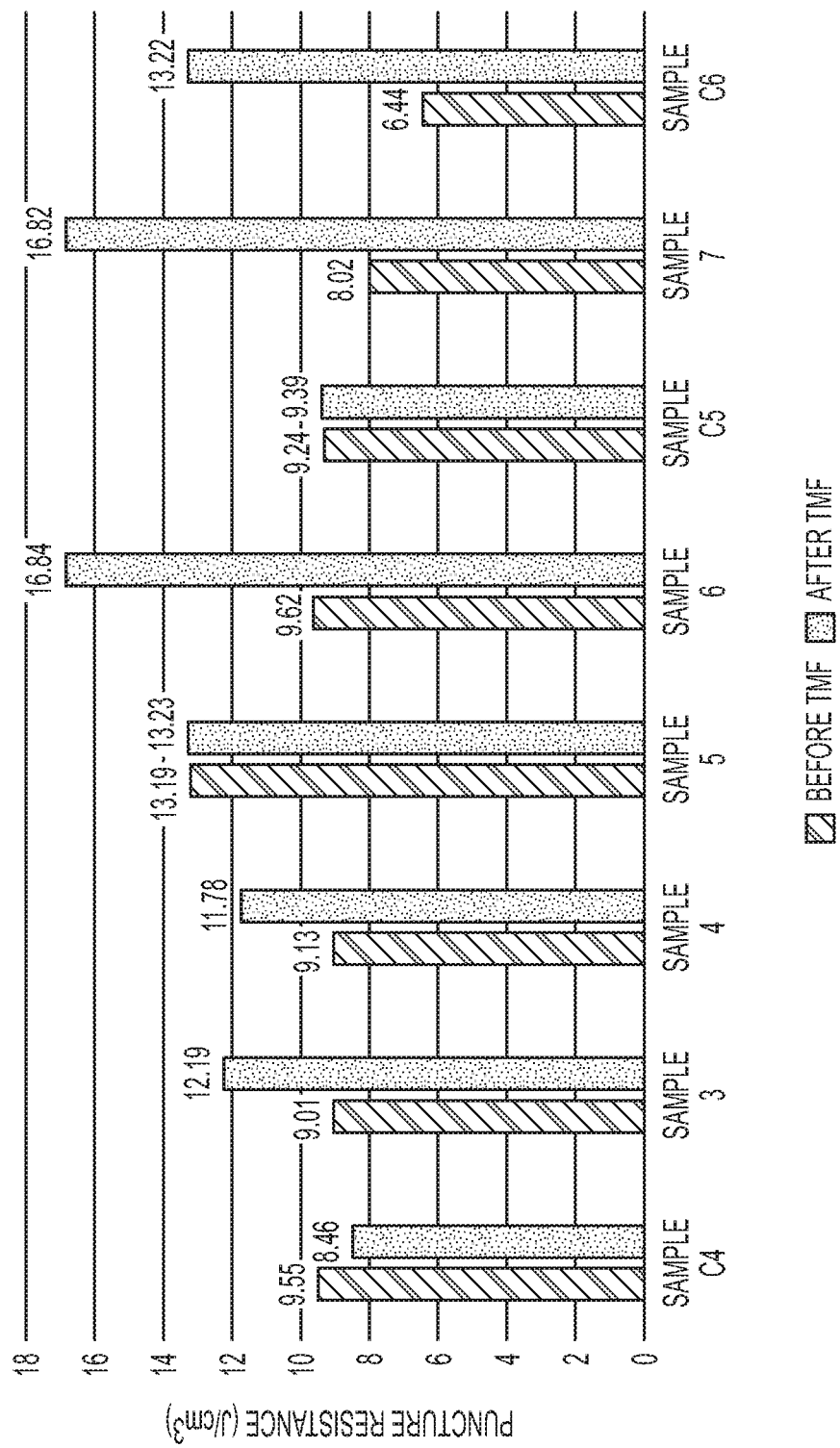
FIG. 7 is a bar graph depicting puncture resistance for several multilayer films before and after thermoforming in accordance with one or more embodiments of the present disclosure.

The puncture resistance for the multilayer films pre-thermoforming and post-thermoforming are provided in FIG. 7. As shown, the inventive multilayer films (Samples 3, 4, and 6), which comprise the Inventive First Compositions 1 or 2, showed improvement in puncture resistance after undergoing thermoforming. Sample 5 also showed marginal improvement in puncture resistance; however, Sample 5 already had a high level of puncture resistance prior to thermoforming.

Comparative Sample 4 (nylon containing multilayer film), Comparative Sample 5 (Nylon and EVOH containing multilayer film), and Comparative Sample 6 (EVOH containing multilayer film) include polyamide, and/or EVOH, which are commonly used in thermoformed packages. The inventive samples (Samples 3-6) achieved comparable puncture resistance, and suitable dart performance, and stiffness, while utilizing a monomaterial (i.e., only ethylene-based polymer) package. In Inventive Sample 7, which combines Inventive First Composition 2 and EVOH, there is a significant increase in puncture resistance after thermoforming, thus indicating synergistic benefits when including EVOH and the inventive first composition.

Additionally, Samples 5 and 6, which both include Inventive First Composition 2 having a density of 0.926, demonstrated further surprising results. As shown, Sample 5, which included 40% of the overall thickness of Inventive First Composition 2, maintained its puncture resistance after thermoforming. However, for Sample 6, which included 60% of the overall thickness of Inventive First Composition 2, puncture resistance greatly increased after thermoforming.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

The invention claimed is:

1. A thermoformed multilayer film structure comprising:
a core layer and at least two outer layers disposed externally relative to the core layer,
wherein at least one layer of the thermoformed multilayer film structure comprises a first composition comprising at least one ethylene-based polymer, wherein the first composition comprises a Molecular Weighted Comonomer Distribution Index (MWCDI) value greater than 1.2, and a melt index ratio ($I_{10}/I_2$) that meets the following equation: $I_{10}/I_2 \geq 7.0 - 1.2 \times \log(I_2)$.

2. The thermoformed multilayer film structure of claim 1, wherein the thermoformed multilayer film structure comprises at least one of polyamide, ethylene vinyl alcohol (EVOH), and malleated polyolefins.

3. The thermoformed multilayer film structure of claim 1, wherein the thermoformed multilayer film structure is substantially free of propylene-based polymers.

4. The thermoformed multilayer film structure of claim 1, wherein the thermoformed multilayer film structure consists essentially of ethylene-based polymers.

5. The thermoformed multilayer film structure of claim 1, wherein the core layer comprises the first composition.

6. The thermoformed multilayer film structure of claim 1, wherein at least one of the outer layers comprises the first composition.

7. The thermoformed multilayer film structure of claim 6, wherein the ethylene-based polymer is an ethylene-α-olefin interpolymer, where the α-olefin comprises one or more $C_3$-$C_{12}$ olefins.

8. The thermoformed multilayer film structure of claim 1, wherein at least one of the outer layers comprises propylene-based polymers.

9. The thermoformed multilayer film structure of claim 1, wherein the thermoformed multilayer film structure has a total thickness of 50 to 250 μm.

10. An article comprising the thermoformed multilayer film structure of claim 1.

11. The article of claim 10, wherein the article is a flexible packaging material.

12. The thermoformed multilayer film structure of claim 1, wherein the thermoformed multilayer film is a thermoformed blown film.

13. The thermoformed multilayer film structure of claim 1, wherein the thermoformed multilayer film is a thermoformed cast film.

14. A thermoformed monolayer film comprising:
a first composition comprising at least one ethylene based polymer, wherein the first composition comprises a Molecular Weighted Comonomer Distribution Index (MWCDI) value greater than 1.2, and a melt index ratio ($I_{10}/I_2$) that meets the following equation: $I_{10}/I_2 \geq 7.0 - 1.2 \times \log(I_2)$,
wherein the thermoformed monolayer film demonstrates an increase in puncture resistance of at least 10% due to thermoforming applications.

15. The thermoformed monolayer film of claim 14, wherein the thermoformed monolayer film structure consists essentially of ethylene based polymer.

16. The thermoformed monolayer film of claim 14, wherein the thermoformed monolayer film structure has a total thickness of 50 to 250 μm.

17. An article comprising the thermoformed monolayer film structure of claim 14.

18. The article of claim 17, wherein the article is a flexible packaging material.

19. The thermoformed monolayer film structure of claim 14, wherein the thermoformed monolayer film is a thermoformed blown film.

20. The thermoformed monolayer film structure of claim 14, wherein the thermoformed monolayer film is a thermoformed cast film.

* * * * *

UNITED STATES PATENT AND TRADEMARK OFFICE
CERTIFICATE OF CORRECTION

Page 1 of 1

PATENT NO. : 11,384,228 B2
APPLICATION NO. : 16/647238
DATED : July 12, 2022
INVENTOR(S) : Maria Laura Perez Munoz et al.

It is certified that error appears in the above-identified patent and that said Letters Patent is hereby corrected as shown below:

On the Title Page

Column 1, Item (72), Line 1:
Inventors: Maria Laura Perez Munoz, Bueonos Aires (AR); ....
Should Read:
Inventors: Maria Laura Perez Munoz, Buenos Aires (AR); ....

Signed and Sealed this
Twenty-third Day of May, 2023

Katherine Kelly Vidal
*Director of the United States Patent and Trademark Office*